US011433495B2

(12) United States Patent
Jones et al.

(10) Patent No.: US 11,433,495 B2
(45) Date of Patent: *Sep. 6, 2022

(54) MACHINE TOOL

(71) Applicant: Hybrid Manufacturing Technologies Limited, Moira (GB)

(72) Inventors: Jason B. Jones, Fairview, TX (US); Peter Coates, Sutton Coldfield (GB)

(73) Assignee: Hybrid Manufacturing Technologies Limited, Moira (GB)

( * ) Notice: Subject to any disclaimer, the term of this patent is extended or adjusted under 35 U.S.C. 154(b) by 270 days.

This patent is subject to a terminal disclaimer.

(21) Appl. No.: 14/407,056

(22) PCT Filed: Jul. 16, 2013

(86) PCT No.: PCT/GB2013/051906
§ 371 (c)(1),
(2) Date: Dec. 10, 2014

(87) PCT Pub. No.: WO2014/013247
PCT Pub. Date: Jan. 23, 2014

(65) Prior Publication Data
US 2015/0183070 A1    Jul. 2, 2015

(30) Foreign Application Priority Data

Jul. 16, 2012  (GB) ...................................... 1212629
Apr. 30, 2013  (GB) ...................................... 1307796

(51) Int. Cl.
*B23P 23/04*     (2006.01)
*B23K 26/08*     (2014.01)
(Continued)

(52) U.S. Cl.
CPC .............. *B23P 23/04* (2013.01); *B05B 7/228* (2013.01); *B05B 13/02* (2013.01); *B05B 15/65* (2018.02);
(Continued)

(58) Field of Classification Search
CPC ........ B23P 23/04; B23P 15/02; B23K 26/082; B23K 26/342; B23K 10/027;
(Continued)

(56) References Cited

U.S. PATENT DOCUMENTS 2,886,695 A    5/1959  Todd
3,865,297 A    2/1975  Stiefel et al.
4,492,843 A *  1/1985  Miller .................. B23K 26/123
                                                    219/121.63
(Continued)

FOREIGN PATENT DOCUMENTS

CA    2074742 A1    1/1993
CN    1132675 A    10/1996
(Continued)

OTHER PUBLICATIONS

Google English translation of JP2003320471, Komine, Nov. 11, 2003. Tool holder and machine tool. (Year: 2003).*
(Continued)

*Primary Examiner* — Chee-Chong Lee
(74) *Attorney, Agent, or Firm* — Alliance IP, LLC

(57) ABSTRACT

A machine tool arranged to deliver an energy source through a processing head onto a work-piece, wherein;
the machine-tool has a clamping mechanism arranged to temporarily receive the processing-head, or another machining or processing-head, to process a work-piece;
the processing-head comprising one or more guiding mechanisms arranged to direct the energy source onto a work-piece and a processing-head docking-manifold
(Continued)

arranged to have connected thereto one or more media to be, in use, supplied to the processing-head to facilitate processing of the work-piece;

wherein the processing-head docking-manifold allows the one or more media to be supplied to the processing-head when the processing-head is connected to the clamping mechanism; and wherein the machine-tool also comprises at least one mechanism arranged to move a supply docking-manifold into and/or out of connection with the processing-head docking-manifold such that when the two manifolds are connected the or each media is supplied to the processing head.

8 Claims, 14 Drawing Sheets

(51) Int. Cl.
| | |
|---|---|
| B23K 26/34 | (2014.01) |
| B05C 19/06 | (2006.01) |
| B23K 9/32 | (2006.01) |
| B05C 5/00 | (2006.01) |
| B23K 26/342 | (2014.01) |
| B23K 26/082 | (2014.01) |
| B23K 26/14 | (2014.01) |
| B05B 7/22 | (2006.01) |
| B05B 15/65 | (2018.01) |
| B29C 64/209 | (2017.01) |
| B05B 13/02 | (2006.01) |
| B05D 1/02 | (2006.01) |
| B05D 3/00 | (2006.01) |
| B33Y 30/00 | (2015.01) |
| B23K 10/02 | (2006.01) |
| B23K 15/00 | (2006.01) |
| B23K 15/08 | (2006.01) |
| B23K 26/06 | (2014.01) |
| B23K 26/36 | (2014.01) |
| B33Y 10/00 | (2015.01) |
| B33Y 80/00 | (2015.01) |
| B23K 9/04 | (2006.01) |
| B23K 26/00 | (2014.01) |
| B23P 15/02 | (2006.01) |
| B29C 73/24 | (2006.01) |
| B23K 26/70 | (2014.01) |
| B41J 2/175 | (2006.01) |
| B23K 101/00 | (2006.01) |
| B22F 10/20 | (2021.01) |
| B29L 31/08 | (2006.01) |

(52) U.S. Cl.
CPC ............. *B05C 5/001* (2013.01); *B05C 19/06* (2013.01); *B05D 1/02* (2013.01); *B05D 3/002* (2013.01); *B23K 9/04* (2013.01); *B23K 9/323* (2013.01); *B23K 10/027* (2013.01); *B23K 15/0026* (2013.01); *B23K 15/0086* (2013.01); *B23K 15/08* (2013.01); *B23K 26/0093* (2013.01); *B23K 26/0626* (2013.01); *B23K 26/082* (2015.10); *B23K 26/0876* (2013.01); *B23K 26/0884* (2013.01); *B23K 26/1482* (2013.01); *B23K 26/34* (2013.01); *B23K 26/342* (2015.10); *B23K 26/36* (2013.01); *B23P 15/02* (2013.01); *B29C 64/209* (2017.08); *B29C 73/24* (2013.01); *B33Y 10/00* (2014.12); *B33Y 30/00* (2014.12); *B33Y 80/00* (2014.12); *B22F 10/20* (2021.01); *B23K 26/702* (2015.10); *B23K 2101/001* (2018.08); *B29L 2031/082* (2013.01); *B41J 2/175* (2013.01)

(58) Field of Classification Search
CPC ................ B23K 15/0086; B23K 15/08; B23K 26/0626; B23K 26/0876; B23K 26/0884; B23K 26/1482; B23K 26/34; B23K 26/36; B23K 11/36; B23K 37/04; B23K 11/11; B23K 9/04; B23K 9/323; B05B 12/00; B05B 13/02; B05B 15/65; B05B 7/228; B05C 5/001; B05C 19/06; B05D 1/02; B05D 3/002; B33Y 10/00; B33Y 30/00; B33Y 80/00
USPC ....................................................... 219/76.14
See application file for complete search history.

(56) References Cited

U.S. PATENT DOCUMENTS

| | | | |
|---|---|---|---|
| 4,621,762 A | 11/1986 | Bronowski | |
| 4,645,901 A | 2/1987 | Scholz et al. | |
| 4,698,480 A | 10/1987 | Klingel | |
| 4,724,299 A | 2/1988 | Hammeke | |
| 4,814,575 A | 3/1989 | Petitbon | |
| 5,073,694 A * | 12/1991 | Tessier | B23K 26/146 |
| | | | 219/121.7 |
| 5,160,824 A | 11/1992 | Babel | |
| 5,207,371 A | 5/1993 | Prinz et al. | |
| 5,208,431 A | 5/1993 | Uchiyama et al. | |
| 5,304,771 A | 4/1994 | Griffin | |
| 5,477,026 A | 12/1995 | Buongiomo | |
| 5,512,726 A | 4/1996 | Arantes et al. | |
| 5,906,760 A | 5/1999 | Robb | |
| 6,342,687 B1 | 1/2002 | Sukhman et al. | |
| 6,774,338 B2 | 8/2004 | Baker et al. | |
| 7,020,539 B1 * | 3/2006 | Kovacevic | B22F 3/1055 |
| | | | 483/16 |
| 7,045,738 B1 | 5/2006 | Kovacevic et al. | |
| 7,462,143 B2 | 12/2008 | Hackman et al. | |
| 7,939,003 B2 | 5/2011 | Bonassar et al. | |
| 8,546,717 B2 * | 10/2013 | Stecker | B22F 3/1055 |
| | | | 219/121.13 |
| 9,163,660 B1 | 10/2015 | Sexton | |
| 9,586,298 B2 | 3/2017 | Jones et al. | |
| 10,473,715 B2 | 11/2019 | Matsumoto et al. | |
| 2005/0184032 A1 * | 8/2005 | Yamazaki | B23K 26/0604 |
| | | | 219/121.6 |
| 2005/0248065 A1 | 11/2005 | Owada | |
| 2005/0263505 A1 | 12/2005 | Yamazaki et al. | |
| 2006/0169679 A1 | 8/2006 | Sato et al. | |
| 2006/0242818 A1 | 11/2006 | Penick et al. | |
| 2006/0266740 A1 | 11/2006 | Sato et al. | |
| 2007/0000888 A1 | 1/2007 | Yamazaki et al. | |
| 2007/0115309 A1 | 5/2007 | Miura et al. | |
| 2007/0271757 A1 * | 11/2007 | Nagahama | B23K 26/0093 |
| | | | 29/33 R |
| 2008/0197115 A1 | 8/2008 | Miyake et al. | |
| 2008/0221725 A1 * | 9/2008 | Wakazono | B23K 26/0093 |
| | | | 700/179 |
| 2009/0269153 A1 | 10/2009 | Schevers et al. | |
| 2009/0314136 A1 | 12/2009 | Culf | |
| 2010/0031882 A1 * | 2/2010 | Abe | B05C 5/02 |
| | | | 118/620 |
| 2011/0018445 A1 | 1/2011 | Horng et al. | |
| 2011/0282482 A1 | 11/2011 | Knighton | |
| 2012/0145683 A1 | 6/2012 | Miyagi et al. | |
| 2013/0197683 A1 | 8/2013 | Zhang et al. | |
| 2014/0061170 A1 * | 3/2014 | Lindsay | B23K 26/60 |
| | | | 219/121.54 |
| 2014/0117586 A1 | 5/2014 | Bonassar et al. | |
| 2014/0167326 A1 | 6/2014 | Jones et al. | |
| 2014/0252684 A1 | 9/2014 | Swanson et al. | |
| 2015/0140230 A1 | 5/2015 | Jones et al. | |

(56) References Cited

U.S. PATENT DOCUMENTS

2017/0129180 A1   5/2017   Coates et al.
2020/0086424 A1   3/2020   Jones et al.

FOREIGN PATENT DOCUMENTS

| | | | |
|---|---|---|---|
| CN | 1350906 | A | 5/2002 |
| CN | 1087992 | C | 7/2002 |
| CN | 1426335 | A | 6/2003 |
| CN | 1660542 | A | 8/2005 |
| CN | 101541511 | | 9/2009 |
| CN | 101642810 | | 2/2010 |
| CN | 103878980 | A | 6/2014 |
| DE | 20 2010 007 364 | U1 | 9/2010 |
| DE | 102013207523 | A1 | 10/2014 |
| EP | 0529816 | A1 | 3/1993 |
| EP | 0790875 | A1 | 8/1997 |
| EP | 0895850 | A1 | 2/1999 |
| EP | 0 967 067 | A1 | 12/1999 |
| EP | 1201347 | A2 | 5/2002 |
| EP | 1568438 | A1 | 8/2005 |
| EP | 1614497 | A1 | 1/2006 |
| EP | 1859893 | A1 | 11/2007 |
| JP | 61164738 | A | 7/1986 |
| JP | 63174837 | A | 7/1988 |
| JP | H10501463 | A | 2/1998 |
| JP | H11347761 | A | 12/1999 |
| JP | 2003025183 | A | 1/2003 |
| JP | 2003320471 | A * | 11/2003 ............ B23K 26/06 |
| JP | 2003320471 | A | 11/2003 |
| JP | 2003340871 | A | 12/2003 |
| JP | 2005013275 | A | 1/2005 |
| JP | 2005186180 | A | 7/2005 |
| JP | 2005238253 | A | 9/2005 |
| JP | 2006255887 | A | 9/2006 |
| JP | 4242878 | B2 | 3/2009 |
| JP | 2010000596 | A | 1/2010 |
| WO | 9015375 | A1 | 12/1990 |
| WO | 9520458 | A1 | 8/1995 |
| WO | 9710067 | A1 | 3/1997 |
| WO | 02073324 | A2 | 9/2002 |
| WO | 2006020685 | A2 | 2/2006 |
| WO | 2010131734 | A1 | 11/2010 |
| WO | 2013079275 | A1 | 6/2013 |
| WO | 2014013247 | A2 | 1/2014 |
| WO | 2014165735 | A1 | 10/2014 |
| WO | 2014197732 | A2 | 12/2014 |
| WO | 2015012992 | A2 | 1/2015 |
| WO | 2015073367 | A1 | 5/2015 |

OTHER PUBLICATIONS

PCT International Preliminary Report on Patentability in PCT International Application Serial No. PCT/GB2013/051906 dated Jan. 20, 2015.
State Intellectual Property Office of the People's Republic of China First Office Action and Search Report in Chinese Application Serial No. 2013800382118 dated May 31, 2016.
U.S. Office Action dated May 19, 2015 in connection with U.S. Appl. No. 14/566,542; 19 pages.
Communication Relating to the Results of the Partial International Search dated Dec. 17, 2013 in connection with International Patent Application No. PCT/GB2013/051906.
Notification of Transmisttal of the International Search Report and Written Opinion of the International Searching Authority, or the Declaration dated Mar. 3, 2014 in connection with International Patent Application No. PCT/GB2013/051906.
Search Report dated Jun. 14, 2013 in connection with United Kingdom Patent Application No. GB1307796.1.
Search Report dated Sep. 26, 2012 in connection with United Kingdom Patent Application No. GB1212629.8.
India Patent Office; Office Action issued in Indian Patent Application No. 59/MUMNP/2015, dated Jul. 26, 2019; 7 pages including English translation.
State Intellectual Property Office of the People's Republic of China; First Office Action issued in Chinese Patent Application No. 2018101552657, dated Jul. 24, 2019; 17 pages including English translation.
Canadian Intellectual Property Office; Office Action issued in Canadian Patent Application No. 2877982, dated Jun. 12, 2019; 4 pages.
European Communication Pursuant to Article 94(3) EPC in European Application Serial No. 13750363.7 dated May 24, 2017.
International Prelimnary Report on Patentability in PCT International Application No. PCT/GB2015/051689 dated Dec. 15, 2016, 12 pages.
International Search Report and Written Opinion for Application No. PCT/GB2015/051689, dated Nov. 27, 2015, 17 pages.
Restriction Requirement dated Nov. 13, 2018 for U.S. Appl. No. 15/317,933, filed Jun. 9, 2015, 8 pages.
United Kingdom Search Report for Patent Application No. GB1412843.3 dated Nov. 28, 2014.
United Kingdom Search Report for Patent Application No. GB1423407.4 dated Jul. 3, 2015.
European Patent Office, Office Action issued for EP Patent Application No. 13750363 7, dated Dec. 7, 2018; 7 pages.
European Patent Office, Office Action issued for EP Patent Application No. 13750363 7, dated Jan. 16, 2018; 7 pages.
State Intellectual Property Office, Third Office Action issued for CN Patent Application No. 201380038211.8, dated Oct. 19, 2017; 17 pages including English translation.
Sraeli Patent Office, Office Action issued for IL Patent Application No. 236610, dated Sep. 13, 2018; 7 pages including English translation.
Japan Patent Office, Office Action issued for JP Patent Application No. 2015-522166, dated May 30, 2018; 7 pages (no English translation available).
Merriam-Webster Inc., "Webster's Ninth New Collegiate Dictionary," Springfield, Massachusetts, USA, 1990, excerpt pp. 254 & 260.
Mexican Patent Office, Office Action issued in MX Patent Application No. MX/a/2015/000387, dated Mar. 2018; 1 page, English translation only.
Patent Office of the Russian Federation, Office Action issued for RU Patent Application No. 2015102771/02(004296), dated Oct. 4, 2018; 16 pages including English translation.
USPTO Final Office Action in U.S. Appl. No. 15/451,130 dated May 21, 2020.
Brazilian Patent Office Action in Brazil Patent Application No. BR112015000851-8 dated Mar. 12, 2020 (6 pages).
European Patent Office; Office Action issued in EP Patent Application No. 13750363.7; dated Oct. 27, 2020; 6 pages.
Japan Patent Office; Office Action issued in Japanese Patent Application No. JP 2018-179136, dated Jun. 9, 2020; 21 pages including English translation.
SIPO; Second Office Action issued in Chinese Patent Application No. CN 201810155265.7, dated May 27, 2020; 12 pages including English translation.
Brazilian Patent Office; Office Action in Brazil Patent Application No. BR112015000851-8 dated Sep. 8, 2021 (4 pages).
EPO; Office Action issued in EP Patent Application No. 13750363. 7, dated Aug. 10, 2021; 5 pages.
India Patent Office; Office Action issued in IN Patent Application No. 202028016265, dated Nov. 30, 2021; 6 pages including English translation.
Japan Patent Office, Office Action issued for JP Patent Application No. 2020-171503, dated Oct. 12, 2021; 31 pages including English translation.

* cited by examiner

MACHINE TOOL

CROSS-REFERENCE TO RELATED APPLICATIONS AND PRIORITY CLAIM

This application claims priority under 35 U.S.C. § 365 to International Patent Application No. PCT/GB2013/051906 filed on Jul. 16, 2013, which claims priority to United Kingdom Patent Application No. 1212629.8 filed on Jul. 16, 2012 and United Kingdom Patent Application No. 1307796.1 filed on Apr. 30, 2013. All of these applications are hereby incorporated by reference in their entirety.

FIELD OF THE INVENTION

This invention relates to a machine tool, or other type of machine, arranged to deliver at least one of an energy source and media through a processing head onto a work-piece. The machine tool may in particular, but not exclusively be referred to as a hybrid machine tool. In particular, but not exclusively, the invention may relate to a deposition system arranged to deposit material onto the surface of a work-piece with or without an energy source being provided in addition to the deposited material.

In addition this invention relates to a machine tool arranged to deposit material through a processing head onto a surface of a work piece.

BACKGROUND OF THE INVENTION

In the past machine tools have been used to remove material from a work piece through what is termed machining and such machine tools have included milling machines and the like which are often computer controlled or Computer Numerically Controlled (CNC). As technology develops it is now possible to use such machines to perform other functions, such as other forms of material removal (ultrasonic, laser and the like), welding and material deposition (such as laser deposition, hard facing, directed energy deposition, additive manufacturing, etc.).

It is known to provide arrangements that provide processing heads that can be fitted to existing machine-tools, such as multi-axis CNC milling machines. However such prior art processing-heads are not convenient as may be desired.

It is also known in the art to use robots, such as robotic arms and the like to process materials. It is perhaps the case that the field of robotic arms and machine tools are converging but it is presently the case that they are different. For example, robotic arms are not as rigid or accurate due to the higher degree of movement and flexibility that they offer, which generally relegates them to second choice for heavy machining operations.

SUMMARY OF THE INVENTION

According to a first aspect of the invention there is provided a machine tool arranged to deliver an energy source, through a processing head onto a work-piece, wherein the machine-tool may have a clamping mechanism arranged to temporarily receive a processing-head, or another machining or processing-head. In some embodiments the first aspect may relate to a robotic arm, or the like, rather than a machine tool.

The machine tool may be arranged to process a work-piece.

Typically the clamping mechanism is housed in the nose of the spindle. Further, the machine tool typically has an axis passing through the processing head when connected to the clamping mechanism and about which the processing-head is arranged to move.

The processing-head may comprise one or more guiding mechanisms arranged to direct the energy source onto a work-piece.

The processing head may also comprise a docking-manifold arranged to have connected thereto one or more media to be, in use, supplied to the processing-head to facilitate processing of the work-piece.

The docking-manifold may allow the one or more media to be supplied to the processing-head when the processing-head is connected to the clamping mechanism.

Conveniently, the machine-tool also comprises at least one mechanism arranged to move a supply docking-manifold into and/or out of connection with the processing-head docking-manifold such that when the two manifolds are connected the, or each, media is supplied to the processing head.

The supply docking-manifold may be arranged to allow the energy source to be transmitted into the processing-head.

Generally embodiments allow the energy source to be transmitted through the processing-head docking-manifold once the two manifolds are connected. Such embodiments are convenient in that they allow the energy source to be connected as the manifolds are brought together.

In other embodiments, the energy source may be transmitted along an axis of the machine tool. The axis may be aligned through an axis of the clamping-mechanism. The skilled person may understand this as being along an axis of the spindle of the machine tool and may include guiding it through a hollow spindle.

Embodiments may have ducts within the docking-manifold arranged to supply at least one of a cooling-medium arranged to cool the or each guiding mechanism within the processing-head, a processable medium arranged to be processed, in use, by the energy source and a shielding medium. Conveniently, each of cooling, shielding and processeable media may simply be referred to as media. Again, such embodiments are convenient since they allow the, or each, media to be conveniently supplied, in use, once the manifolds are connected.

It will be appreciated by those skilled in the art that it is desirable to provide an inert environment when exposing selected materials to energy and/or temperature. This can be done via delivery of shielding gas (ie a shielding medium) locally such as through the processing head. Alternatively, this activity can be undertaken inside a chamber provided around the machine tool, or at least a part of the machine tool, which maintains a vacuum or alternative inert environment.

Many embodiments provide an alignment mechanism arranged to align at least one of the medium supplies and the energy source with the ducts within the processing-head docking manifold. It will be appreciated that energy sources often need to accurately aligned in order that they are focussed, in use, correctly and providing an alignment mechanism ensures that an energy source that is connected as the two manifolds connect is correctly aligned.

In some embodiments, the alignment mechanism is provided, at least in part, by a substantially planar surface.

Conveniently, there is a housing connected to the supply docking-manifold. The housing may contain guiding mechanisms for the energy source. In one embodiment, the housing contains a beam expander arranged to expand a laser beam. Providing at least some of the guiding mechanism external of the processing head can help to ensure that they are provided with a less harsh environment when compared with the environment within the processing head. The skilled person will appreciate that some guiding mechanisms are relatively fragile.

Typically, embodiments are arranged, in use, to focus the energy source onto a region in line with a longitudinal axis of the processing head. Such an arrangement is convenient in that it can make the machine-tool easier to program, since there is no need to take account of offset in multiple axes, and smaller since the working area does not need to account for an offset. The skilled person will understand that as the focus of the energy source is offset from the axis then the working area required to process an object increases significantly since further translations are required to account for the offset.

Embodiments may provide the energy source as at least one of the following: laser, electron beam, arc, plasma, microwaves, masers, focused electromagnetic radiation, or sound waves (including ultrasound), or the like. The electromagnetic radiation may for example be any of the following: x-rays, microwaves, ultraviolet light, infrared radiation, or the like.

The guiding mechanism provided within the processing head and/or within the housing may comprise any of the following: one or more lenses, mirrors, prisms, diffraction gratings, beam expanders, spatial light modulators, optics, electrical coupling mechanism, conductive media paths, induction coupling mechanism, beam steering components, beam steering field generators, micro-electromechanical systems, micro-mirror devices, shielding components such as Electro Magnetic Interference (EMI) shielding including co-axial cable, or the like. However, it is convenient if the processing-head comprises more robust and fewer components.

In particular, the processing-head, in some embodiments, may comprise a lens and a reflector.

The machine tool may, in use, be arranged to supply at least one of the following: a metal, polymer, or ceramic material typically in powder or filament form; cooling or processing fluids; gases; processing fluid, or the like.

Conveniently, a controller of the machine-tool is arranged to cause the machine-tool to change the processing-head within the clamping mechanism automatically, or at least semi-automatically. The skilled person will appreciate that the term controller of the machine tool is arranged to cover both controllers internal of the machine tool and those networked or otherwise coupled to the machine tool.

It will be appreciated that the term "machine tool" has been used in relation to the machine as a whole. Interchangeable heads have been described and conventional milling and machining heads, sometimes referred to as machining cutters or tools, have been referred to a machining heads. As disclosed in this application alternative heads, termed "processing heads" are used to process a work piece which may involve the direction of energy to a work piece or the direction of media and energy to a work piece or the application/deposition of media on a work piece.

The skilled man will appreciate that although the invention has been described in relation to a machine tool it is envisaged that it would be possible to modify robots or other additive manufacturing equipment to use tool changes and/or docking stations. Such modified equipment may be considered to be similar to machine tools once they have been so modified.

According to a second aspect of the invention there is provided a kit comprising a processing-head in combination with a supply docking-manifold wherein the processing-head is arranged, in use, to be connected to a clamping mechanism of a machine tool, or the like, and further comprises at least some of the following:
  a) one or more guiding mechanisms arranged to focus an energy source onto a work-piece;
  b) a processing-head docking-manifold arranged to have connected thereto one or more media, in use, to be supplied to the processing-head to facilitate processing of the work-piece; and
  c) the supply docking-manifold comprises a mechanism arranged to move the supply docking-manifold into and/or out of connection with the processing-head docking-manifold such that when the two manifolds are connected media is, in use, supplied to the processing head.

Embodiments may arrange the docking-manifold to allow an energy source to be transmitted into the processing-head. Conveniently, a housing is connected to the supply docking-manifold.

Embodiments may typically provide the processing-head docking-manifold with ducts therein arranged to supply at least one of a cooling-medium arranged to cool the or each guiding mechanism within the processing-head and an energy source processable medium arranged to be processed, in use, by the energy source. Other fluids and/or media as described herein may also be communicated between the two manifolds.

In some embodiments, further guiding mechanisms may be provided in addition to the guiding mechanism within the processing-head, which may be associated with the supply docking-manifold.

At least some embodiments of the invention may arrange at least one of the guiding mechanism (the guiding mechanism within the processing-head and/or the guiding mechanism therein addition to) such that the energy source processable medium can be selectively melted within the processing head or externally of the processing head.

In alternative, or additional embodiments, the kit may comprise a plurality of processing heads each of which is arranged to focus the energy source differently to other processing-heads within the kit. For example, a first processing-head may be arranged to melt the energy source processable medium within the processing head. A second processing head may be arrange to melt the energy source processable medium external to the processing head.

Conveniently the docking-manifold comprises an alignment mechanism arranged to align medium supplies within the supply docking-manifold with ducts within the processing-head docking manifold. In some embodiments a docking arm may be provided which is arranged to connect the head to the clamping mechanism. The arm may then be retracted to a storage location.

In some embodiments there may be multiple docking arms. In addition or alternatively there may be provided multiple tool changers.

Typically, the alignment mechanism is arranged to have, in use, connected thereto a housing arranged to transmit the energy source into the processing-head.

The housing may be arranged to contain the further guiding mechanism in addition to the guiding mechanism contained within the processing-head.

Embodiments will typically be arranged to focus the energy source on to a point or area in line with a longitudinal axis of the processing head.

According to a third aspect of the invention there is provided a method of connecting a processing-head arranged to focus an energy source onto a work-piece; the method comprising:
a) causing a machine tool, or the like, to select the processing-head from a storage location and insert the processing-head into a clamping mechanism of the machine-tool; and
b) activate a mechanism arranged to move a supply docking-manifold into connection with a processing-head docking manifold;
c) wherein connection of the supply docking-manifold and the processing-head docking-manifold provides a supply of one or more medium supplies to the processing-head such that, in use, the or each medium can be supplied.

The method may additionally comprise the process in reverse to replace the processing head within a storage area of the machine tool.

According to a fourth aspect of the invention there is provided a method of repairing a part comprising at least one of the following steps:
a) causing a machine-tool to select a processing-head
b) causing the machine tool to connect a supply of media to the processing head;
c) causing the machine tool to perform an additive processing step in which material is added to the part;
d) causing the machine tool to replace the processing head within a storage area;
e) causing the machine tool to select a machining head from the storage area;
f) causing the machine tool to remove material from at least the material that has been added to the part being repaired; and
g) optionally select an alternative machining, processing or inspection head (such as a touch probe) and inspect or treat the work piece.

The processing head may be the processing head of any of the above aspects of the invention.

The method of paragraphs a and b may be the method of the third aspect of the invention.

In some embodiments there may also be provided connections for electrical, optical and mechanical connections between the processing head and the machine tool. Such connections provide connections for process monitoring sensors and equipment. Such sensors may comprise image recording apparatus, lighting, touch probes, 3D surface and volumetric scanners, sensors such as oxygen sensors and thermal sensors or cameras and the like. In some embodiments the temperature sensor may be used to monitor a temperature of the work piece on which processing is being carried out. The process monitoring sensors or measuring equipment may comprise part of the processing head, part of a manifold arranged to have connected thereto one or more media and/or be in addition to both the processing head and the manifold. For example, some embodiments may provide process monitoring sensors as a separate head, which may be thought of as an inspection head, in addition to any processing heads and machining heads.

In some embodiments the temperature of one or more melt pools may be monitored. A melt pool may be formed where material is deposited. The media may be applied to or toward the work piece and melted by the application of energy from an energy source. Thus, the media may be thought of as being an energy source processable medium.

In additional, or alternative, embodiments, the media may be deposited in a molten state.

According to another aspect of the invention there is provided a multi axis machine tool, the machine tool may have at least one processing head and conveniently at least one machining head. The machine tool may have a clamping mechanism arranged to temporarily receive one of the at least one processing head and/or the at least one machining head, wherein the machine tool may be operable, in use, to perform at least some of the following five steps i) to move the processing head or machining head from an operable position to a head changing position, ii) release the processing head or machining head from the clamping or holding mechanism, iii) select an alternative processing head or machining head; iv) receive the alternative processing head in the clamping or holding mechanism, and v) return to the operable position,
the processing head may be further arranged to deposit material onto a work piece being processed and wherein;
the processing head typically comprises a media supply.

In an embodiment of the invention an energy source may be provided in the processing head. Alternatively an energy source may be generated externally of the processing head and the processing head may be arranged to direct the or otherwise convey the energy source. In some embodiments the energy source is provided by a battery, or other isolated energy source, such as fuel cell or the like. In another additional or alternative embodiment the energy may be generated in the head by the motion of the spindle, such as via a generator, alternator or the like. In other embodiments the energy source is supplied to the processing head.

The machine tool may be arranged to process a work-piece. Alternatively, or in addition the machine tool may be arranged to deposit the material on a work piece or to build a work piece, which may be building the work piece up from scratch. Such an operation may be additive deposition including additive manufacturing, 3D printing, or digital fabrication, or the like. Preferably the machine tool also comprises a tool changer arranged to change a head in the machine tool. The tool changer may exchange a processing head for a machining head or vice versa. Alternatively the machine tool may be provided with two or more processing heads. The tool changer may comprise a storage area located off set from the work piece.

Typically the clamping mechanism is housed in the nose of a spindle. Further, the machine tool typically has an axis passing through the processing head when connected to the clamping mechanism and about which the processing-head is arranged to move.

The processing-head may comprise one or more guiding mechanisms arranged to direct the energy source onto a work-piece. In another embodiment the processing head may comprise one or more guiding mechanisms arranged to direct energy from the energy source into the media and/or to a mechanism for depositing the media. The energy may be applied to the media in the processing head or externally of the processing head such as on the surface of the work piece, or at least as the media moves toward a work piece.

The processing head may comprise, as before, a docking manifold arranged to have connected thereto one or more media that are in use supplied to the processing head to facilitate processing of the work piece. The energy source may be supplied to the media inside the processing head or may as previously described be supplied to the media as it travels toward and/or arrives on the work piece. In one alternative the energy is supplied to the media in the processing head and the media is deposited on the work piece. The energy may be supplied to the media prior to leaving the processing head or may be supplied to the media as the media leaves the processing head.

The processing head may comprise a media supply arranged to supply media to the head from the machine tool, from the clamping mechanism, or from an ancillary piece of equipment connected or convenient to the machine tool. In yet another embodiment the media supply may comprise a media reservoir provided in the processing head. In some embodiments the media reservoir may be continuously refilled via a supply which feeds media through a manifold. In other embodiments the media may be provided in the form of a replaceable cartridge forming a media supply. In yet another embodiment the media reservoir may be refillable while the processing head is located in the tool changer. A supply manifold may be provided in the tool changer and may be arranged to connect to the processing head in the tool changer and to automatically refill the media reservoir. Additionally or alternatively at least one mechanism may be provided to move the supply manifold into and out of connection with a media supply when the processing head is in an operative position on the machine tool or when the processing head is located in the tool changer or another storage location.

In some embodiments one media is supplied to the processing head. In other embodiments two or more media may be supplied to the processing head. The media may for example comprise alternative colours or alternative media. In some embodiments a first media may comprise a building material and a second media may comprise a support material. The support material may be removable once the work piece is completed. Should a plurality of media be provided then the tool may be arranged to be able to selectively use those media.

In some embodiments the media may comprise a polymer material. In other embodiments the media may be selected from a group comprising metals, non-metals, polymers, ceramics, clay or dielectric materials. The media may be provided in any of the following forms: in powder form; filaments, rods, or wires, in semi- to fully liquid form. Alternatively media can be provided as, or in suspension in, a liquid, emulsion, gas, aerosol, slurry or paste.

In one particular embodiment the media may comprise a polymer filament. Typically such a filament may be heated by the energy source to a temperature such that the media can be fed, directed, extruded, jetted or otherwise deposited in a controllable manner. Alternatively a fluid media may be supplied to the processing head from the media reservoir. The media may be heated by the energy source till all the media in the reservoir is fluid and can be dispensed, or otherwise expelled, in a controllable manner. In some embodiments the media may also comprise conductive, semi-conductive, and dielectric material such that electric circuits can be laid down during formation of the workpiece. In an alternative embodiment the media may pass from the reservoir towards a deposition tip of the processing head and the energy may be applied to the media prior to the media leaving the deposition tip. This may be particularly suitable for embodiments in which the media is in the form of a filament or wire and the media can be fed through the processing head by mechanical feeding mechanism such as by rollers. It may be desirable for the media to be relatively stiff until the media is about to be deposited. The energy may be applied just before the media leaves the deposition tip or as or after the media leaves the deposition tip. Alternatively, or additionally, the material may be deposited onto the surface of the work piece and then exposed to the energy.

A media feed may be provided connected to the tool changer. The media feed may supply media to the processing head or to a reservoir in a processing head when the processing head is not in use. The feed may be part of an additional docking mechanism which engages with the processing head or machining head when it is not in use.

According to another aspect of the invention there is provided a kit comprising at least one of a processing head; a media reservoir; a media supply; and an energy source.

In one embodiment there is provided a kit comprising a processing head in combination with a media reservoir wherein the processing head is arranged in use to be connected to a clamping mechanism of a machine tool and wherein the media reservoir is provided in the processing head.

In another embodiment of the invention there is provided a processing head adapted to be connectable to a machine tool according to an aspect of the invention wherein the processing head is suitable for depositing material onto a work piece and wherein the processing head further comprises a media supply preferably in the form of a reservoir.

In a preferred embodiment the processing head further comprises an energy source, or at least a mechanism for generating an energy source, arranged to supply energy to the media and/or to a mechanism for depositing the media.

In an alternative embodiment the kit comprises a processing head arranged to be connectable to a media supply. The media supply may comprise a media feed or manifold connected to the tool changer and arranged to replenish the media reservoir when the processing head is located in the tool changer or may be provided connected to the machine tool and arranged to supply the media to the processing head when the processing head is on the spindle or other usable position.

In some embodiments the media feed may comprise one or more channels and wherein the media feed may feed the media to the work piece or the channels may be arranged to provide reverse flow of the media or may divert or re-circulate the media. In some embodiments there may be a mechanism provided to recapture unused media or to remove waste media or by-products or outgassing. Such a mechanism may be provided in addition to the flow of media in the or each of the channels.

In some embodiments a mechanism to provide the energy source is self contained in the processing head. In other embodiments the energy source is connected to the processing head. The energy source may comprise for example UV, IR, laser or other energy sources as described previously and may in some embodiments direct a beam of energy onto the work piece.

The kit may comprise in alternative or additional embodiments a plurality of processing heads having alternative media supplies contained therein. In a further alternative a processing head may comprise a replaceable cartridge containing a media supply. The cartridge may be automatically replaceable or may be manually replaceable.

In some embodiments the kit may further contain a docking manifold arranged to supply a media to the processing head. The docking manifold may comprise one or more ducts within the manifold arranged to supply at least one source of media to the processing head.

Alternatively the kit may comprise a media supply mechanism arranged to supply a media to the processing head. The media supply mechanism may be arrangeable to supply media to the processing head when the processing head is in an operable position on a spindle of the machine tool or alternatively the media supply mechanism may be arranged to supply media to the processing head when the processing head is located in the tool changer.

According to another aspect of the invention there is provided a method of forming a work piece comprising
  a) causing a machine tool to select a processing head from a storage location to insert the processing head into a clamping mechanism of the machine tool; and
  b) activating a mechanism arranged to supply energy to a media in the processing head and/or to a mechanism for depositing the media;
  c) controlling deposition of the media from the processing head so as to construct a work piece.

In some embodiments of the method a further step may be carried out in which heat or other energy from the deposition or consolidation of media on the work piece, is also used to heat a surface of the work piece. In addition or alternatively heat from the deposition may be used to cure, melt, sinter, crosslink, react or otherwise catalyse change in the deposited material. For example, inks or pastes for directly printing electronics may require heating to achieve their designed conductivity, resistivity or other properties; may derive secondary benefit from the heat of deposition operations, rather than requiring additional heating steps. Where secondary benefits cannot be leveraged for material treatment, an explicit processing step can be made as described below.

According to a further aspect of the invention there is provided a material processing system comprising a material processor, which may be a machine tool or a robotic arm or the like, having a processing head which the material processing system is arranged to move relative to a work piece and a controller arranged to control the movement of the processing head; typically, the processing head will comprise one or more guiding mechanisms arranged to direct an energy source on the work piece under the control of the controller, where the controller can typically control the amount of power delivered to a given area of the work piece.

Here power is intended to have its correct meaning of total energy accumulated over time. Thus, it will be appreciated that in order to control the power it is possible to control the rate at which energy is supplied (ie the power thereof) or to control the rate which the energy source is moved across the work-piece.

Such embodiments are convenient as they can control the effect that the energy source has on the work piece. The skilled person will appreciate that the power that is delivered can significantly effect what happens to the work piece.

The controller may be arranged to use the movement of the processing head to control the amount of power. The skilled person will appreciate that if the processing head is moved at a relatively higher speed across the work piece that less power will be provided to the work piece than if the processing head is moved at a relatively lower speed.

The energy source may be any of the sources described in relation to the above aspects of the invention.

Thus, in some embodiments, the guiding mechanism may comprise at least one lens arranged to focus the energy source on to the work piece. The guiding mechanism may comprise any of the guiding mechanisms mentioned elsewhere.

As with the aspects described above, embodiments of the invention may be provided with a mechanism to generate the energy sources internally of the processing head. Additional, or alternative, embodiments may be arranged to direct an energy source which is generated externally of the head.

The processing head may comprise a mechanism to selectively activate or deactivate the energy source. For example, the controller may be arranged to selectively activate and/or deactivate generation of an energy source. Thus, in the example of a laser beam, the controller may be arranged to activate and/or deactivate the generation of the laser beam or alternatively the controller may be arranged to control the focusing or de-focusing of the laser beam, or the like.

The controller may be provided by a processing circuitry external to the material processor, wherein the material processor is one of a machine tool and a robotic arm or the like. For example, the processing circuitry may be provided by a computer external to but connected to the material processor. In other embodiments the controller may be provided by a processing circuitry within the material processor.

The material processor may be arranged to change the material properties of the work piece. For example, the material processor may be arranged to control the power such that the, or a least a portion of, the work piece is heated, pre-heated, hardened, softened, deliberately stressed, stress-relieved, or porosity/void-related defects reduced/closed. These operations may be undertaken to avoid cracking, warping, and other defects. Alternatively, the surface of the work piece may be modified such as by marking, texture patterning, texture enhancement, selective oxidation, or have its surface roughness reduced through re-melting, ablation, etc. Alternatively the grain structure or chemistry could be modified such as converting steel grains to be martensitic or inducing local alloying with an additional material or carburizing.

The material processing system may also comprise a fluid supply, which would typically be under the control of the controller. The controller may be arranged to control the supply of fluid from the fluid supply to quench, clean, shot peen, sand blast or treat the, or at least the portion of, the work piece which is being processed.

Alternatively, or additionally, the controller may be arranged to control the supply of fluid to provide an inert or element rich (as in carburizing) environment, to quench, to lubricate, or the like the, or at least a portion, of the work piece. Such fluids, gases and liquids may also be thought of as media.

There may be more than one fluid supply wherein each fluid supply may be arranged to supply a different fluid.

The fluid supplied by the or each fluid supply may be any one of the following: water; oil; an inert gas such as a noble gas; air, machine coolant, etchant, cleaning fluid, patina, colorant, or the like.

In other embodiments, the controller may be arranged to control the energy source processing the work piece. Here processing of the work piece is intended to cover at least the following: stressing; stress relieving; microstructure modification; chemistry modification; porosity reduction/elimination; welding; brazing; joining; cutting; drilling; milling; marking; plasma spraying; thermal spraying; surface re-melting; heat treating; or the like.

In some embodiments, the material processing system may comprise a supply of media. The supply of media may be as described in relation to any of the above aspects of the invention. Thus, in some embodiments, the supply of media may be delivered into the processing head via a manifold. In other embodiments, the supply of media may be provided within the processing head conveniently by a cartridge or the like.

In some embodiments the material processing system may be arranged to supply media to a work piece that has previously been heated by the energy source. In such embodiments, the media may comprise a powder, or the like. Such powders, and similar materials, may be arranged to melt, sinter, and/or chemically react on the work piece due to, or at least accelerated by, the power previously applied to the work piece by the processing head.

According to a further aspect of the invention there is provided a method of processing a work piece by controlling the power delivered to the work piece by guiding an energy source relative to the work piece, under the control of a controller, such that a material property of the work piece is changed.

The skilled person will also appreciate that aspects of the invention may comprise software, firmware, or hardware elements arranged to provide control of the machine tools described herein.

Manufacturing a work piece using a combination of an additive process, including deposition, and a subtractive process, including milling, as required is a form of hybrid manufacturing as known in the art; the change over between these (and other operations, such as probing) is made convenient by embodiments and aspects described herein.

The skilled person will appreciate the above aspects of the invention introduce various features and will further appreciate that the features from one aspect of the invention are applicable, mutatis mutandis, to other aspects.

BRIEF DESCRIPTION OF THE DRAWINGS

There now follows, by way of example only, a detailed description of an embodiment of the invention of which:

FIG. 18 shows a further embodiment in which a processing head is arranged to deliver a source of energy onto a work piece.

DETAILED DESCRIPTION OF THE DRAWINGS

Figure 1:
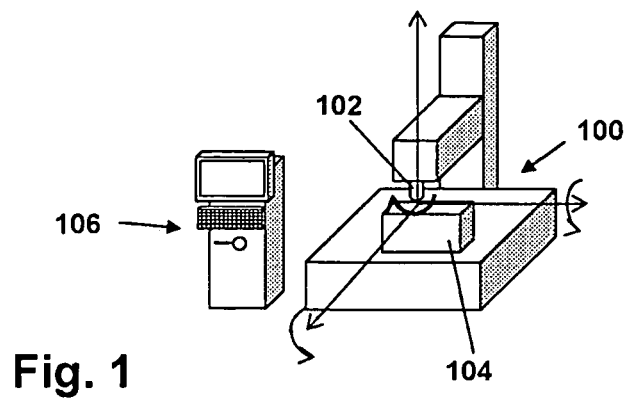
FIG. 1 shows a machine tool.

FIG. 1 shows, schematically, a machine-tool 100, which typically comprises a machining head 102 held in a clamping mechanism of the machine-tool 100 and arranged to machine a work-piece 104. Further, the machine-tool 100 is usually controlled by a controller 106 which controls the position of the machining-head 102 as it processes the work-piece 104.

Most machine-tools 100 are arranged such that the machining-head 102 can be interchanged with other machining-heads 102 in order that the correct machining-head 102 is provided for the task at hand. Providing the example of milling machine, then a first machining-head may be provided for coarse material removal, whereas a second machining-head may be provided for fine material removal.

As such, machine-tools 100 have tool-changers which can, typically under the control of the controller 106, change the machining head 102 being used by the machine-tool 100 to process the work-piece 104.

Figure 2:
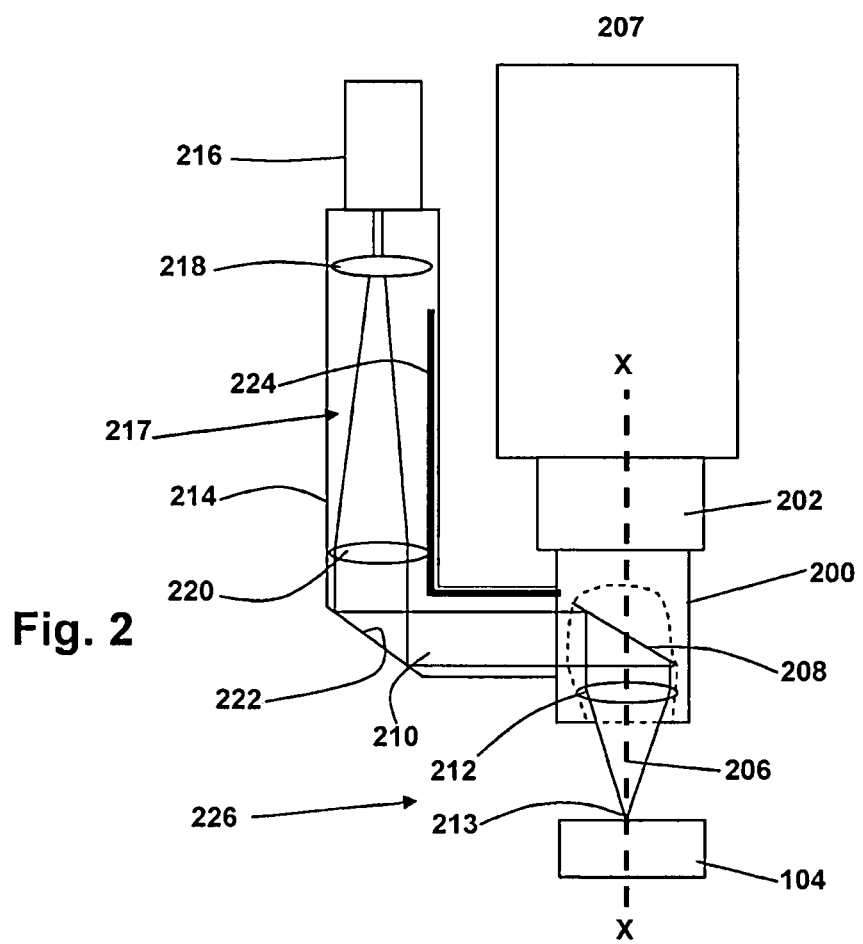
FIG. 2 schematically shows a section through parts of an embodiment of the invention.

FIG. 2 illustrates a processing-head 200 which connects to the machine-tool 100 using the clamping mechanism 202 of the machine-tool 100 and which can be stored in a store of machining-heads and automatically connected to the machine-tool 100 with a tool-changer thereof. Here the tool-changer may provide a storage-location for processing-heads, machining-heads, etc. which are not currently being used by the machine-tool. Discussion herein refers to a clamping-mechanism 202 and it is assumed that a spindle into which the clamping mechanism 202 connects is part of the machine-tool 100.

In the embodiment being described, the processing head 200 is arranged to focus a laser beam 206 onto the work-piece 104. In other embodiments, other energy sources may be utilised instead of the laser. Thus, the processing head is arranged, under the control of the controller 106, to process the work-piece 104 with the focussed laser beam 206 (or other energy source).

In FIG. 2, a section is shown through the processing-head 200 and it can be seen that a reflector, such as a mirror 208, arranged to move an incoming laser beam 210 through ninety degrees to be incident upon a focussing-lens 212 for creation of the focussed-laser beam 206. The focusing-lens 212 may be thought of as being a guiding-mechanism. It will be appreciated that other processing heads 200 may have other arrangements of the optical parts such as the reflector and focussing lens, or indeed may have additional optical parts.

In addition to the laser beam and optical components, the processing-head 200 also contains one or more ducts to deliver a media. For the example, the media may comprise a polymer and/or metallic powder within a transport fluid which is arranged to be melted by the energy source. The processing is arranged such that media is delivered through the processing-head and it passed into the energy source such that it is molten or at least semi-molten before the media reaches the work-piece 104. As such, the processing-head can be used to deposit material onto the work-piece and provide a deposition system, which may for example be used to repair parts.

The machine tool (including a spindle) and the clamping-mechanism 202 have a longitudinal axis, represented by the dashed line XX in FIG. 2. Should a machining-head (such as a milling cutter) be present within the clamping-mechanism 202 then it would rotate about the axis XX. Conveniently, the energy source, which in the embodiment being described is the laser-beam 206, is focused onto a point, area, etc. 213 that lies substantially upon the axis XX on the surface of the work-piece 106.

In other embodiments, the focusing-lens 212 may in fact be arranged to cause a divergent beam, such as would be the case for pre-heating the substrate, heat treating the work piece or in some types of thermal spraying and the like.

Although not shown in the drawings, some embodiments of the invention may be arranged to transmit an energy source through a spindle of the machine tool along the axis XX; ie from the region of point 207 shown in FIG. 2. In such embodiments the supply-unit would supply media to the processing head 200.

Adjacent to the processing head 200 and clamping-mechanism 202 there is provided a supply-unit 214 which provides a housing in which various components are housed. The processing-head 200 comprises a processing-head docking-manifold 201 and the supply-unit 214 comprises a supply docking-manifold 300, described hereinafter, which are arranged to mate with one another to connect the supply-unit 214 to the processing-head 200 in the condition as shown in FIG. 2.

On top of the supply-unit 214 there is provided an energy source 216, which in the embodiment being described is a laser. The laser 216 generates a beam which is transmitted into the supply-unit 214 and passes through a beam expander 217 comprising a first and a second lens 218, 220 respectively. The beam expander 217 is utilised to increase the diameter of the laser beam in order to achieve a better final focus onto the work-piece 104 and reduce the thermal load on the optics.

The supply-unit 214 also comprises a further reflector 222 arranged to reflect the beam of light from the laser through 90° toward the processing head 200 and the reflector 208 therewithin. Each of the lenses 218, 220 and reflector 222 may be thought of as being guiding mechanism provided within the supply-unit 214.

The supply-unit 214 also comprises a supply of various media 224 which connects through the manifold to the processing-head 200 when the supply-unit 214 is connected thereto.

The skilled person will appreciate that the area 226 around the work-piece 104 is typically referred to as the working area (or volume) of the machine-tool.

Figure 3:
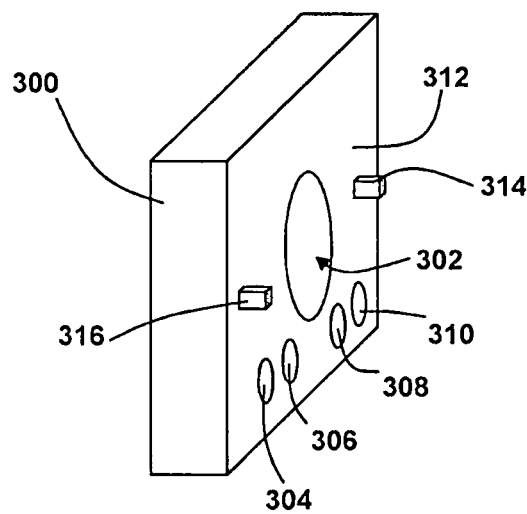
FIG. 3 shows further detail of a manifold used in an embodiment of the invention.

FIG. 3 shows the supply docking-manifold 300 of the supply-unit 214 of an embodiment of the invention. Central to the supply docking-manifold 300 is a duct 302 arranged to allow the energy source, which in the embodiments described herein is a laser, to pass between the supply-unit 214 and the processing-head 200.

Also visible on the supply docking-manifold 300 are ducts 304, 306, 308, 310 which are arranged to deliver cooling medium, a shielding gas and material to be processed by the processing-head 200 from the supply-unit 214 to the processing-head 200. Typically a seal will be provided on at least one of the manifold on the supply-unit 214 and the manifold on the processing head 200 in order that the ducts 304-310 are sealed and to prevent the escape of the media passing therethrough.

As the skilled person will appreciate the shielding gas will typically be an inert gas such as argon or the like arranged to prevent chemical reactions, such as oxidation, etc, from occurring on the work-piece 104 as it is being processed.

In some embodiments, the beam expander 217 may be arranged such that it may be adjusted in order to vary the focal point of the final focus. Such an arrangement may help to determine whether material to be processed is melted by the energy source within the processing-head or after the processing-head. The skilled person will appreciate that varying the point at which the processable material melts can determine the bonding, finish and residual stress on the work-piece being processed.

In one embodiment, the mating surfaces of the two manifolds (ie face 312 on the supply docking-manifold 300 and the corresponding face on the processing-head docking-manifold) are substantially planar so that, as described hereinafter, the supply-unit 214 can be docked when away from the processing head 200 in a manner to prevent the ingress of dirt into the duct 302 in particular. Thus, the substantially planar surface may be thought of as a flat surface and may be thought of as providing an alignment mechanism.

Also provided on the supply docking-manifold 300 are provided locating mechanisms (in this case locating pins 314, 316) arranged to engage with complementary features on the processing-head docking-manifold. The skilled person will appreciate the pins 314, 316 be provided on the processing-head docking-manifold and recesses on the supply docking-manifold 300 or one or more pins may be provided on each manifold. Indeed locating mechanisms other than locating pins may be used. The locating mechanisms, in addition to the substantially planar surfaces, may be thought of as being an alignment mechanism.

FIG. 4 shows the supply-unit 214, the processing head 200 and the clamping mechanism 202 arranged in various conditions relative to one another as is now described.

Figures 4A, 4B, 4C:
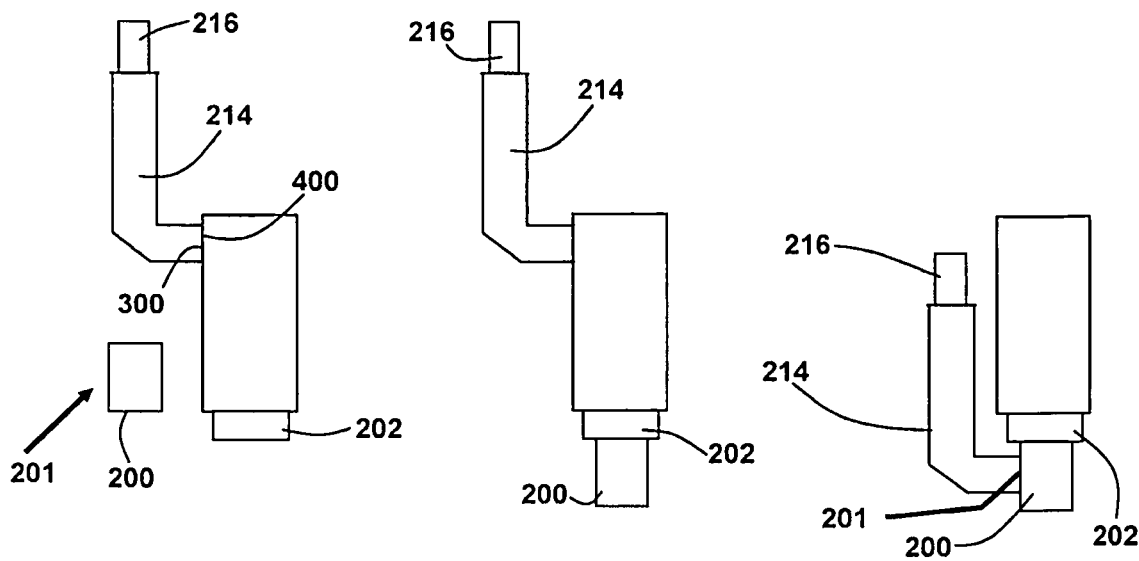
FIG. 4a shows an embodiment of the invention in an unassembled manner.
FIG. 4b shows the embodiment of FIG. 4a in a partially assembled manner.
FIG. 4c shows the embodiment of FIGS. 4a and 4b in a fully assembled manner.

In FIG. 4a, shows an undocked condition, in which the supply-unit 214 is in a first condition, which may be thought of as a storage condition. The supply docking-manifold 300 thereon is positioned against a substantially planar docking surface 400 in order that the ducts 302-310 are closed. The processing head 200 is stored away from the clamping-mechanism 202. Often the processing head 200 will be stored in a tool-changer of the machine-tool 100 but this need not be the case.

FIG. 4b shows the system in a condition in which the processing-head 200 has been positioned within the clamping mechanism 202 whilst the supply-unit 214 remains in the first condition as shown in FIG. 4a. The processing head 200 will typically be selected and inserted into the clamping mechanism 202 using the machining head changing routine. The skilled person will appreciate that in many embodiments this changing routine is automatic, or at least semi-automatic, and is often under the control of the controller 106.

FIG. 4c shows the system in a docked condition, in which the supply-unit 214 is in a second condition with the supply docking-manifold 300 cloaked against the processing-head. In the docked condition, the ducts 302-310 in the supply docking-manifold 300 align with co-operating ducts within the processing-head 200.

In some embodiments, an air blast system is associated with the supply docking-manifold 300 such that as the supply docking-manifold 300 is disconnected from the processing-head docking-manifold a blast of air (or indeed any other suitable fluid) passes over or through the ducts 302-310 to help try and prevent contamination from entering those ducts.

The skilled person will appreciate the three stages in FIGS. 4a to 4c outline connecting the processing-head 200 to the clamping-mechanism 202 before the supply-unit 214 is connected to the processing-head 200. In other embodiments, the order of connection may be different and for instance it is conceivable that supply-unit 214 could be connected to the processing-head 200 before the processing-head 200 is engaged into the clamping-mechanism 202.

Figure 5:
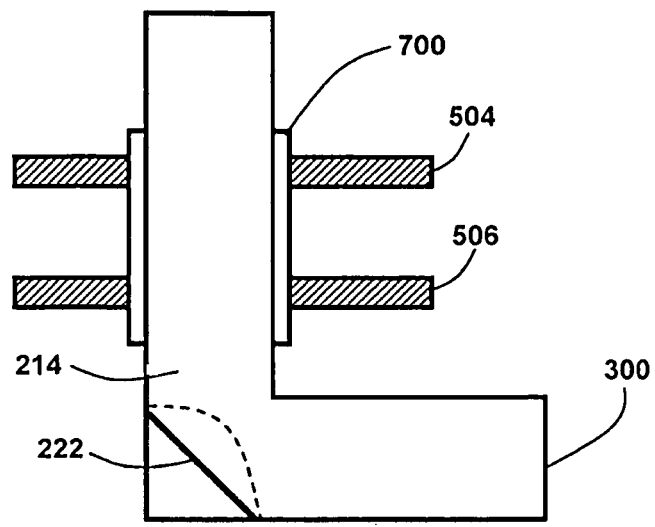
FIG. 5 shows a view of an embodiment of the invention from a first angle.

FIG. 5 shows a further embodiment although like parts are referred to the same reference numerals. FIG. 5 illustrates mechanisms that are used to move the supply-unit from the first, undocked, condition (as shown in FIG. 4a) to the second, docked, condition (as shown in FIG. 4c).

Figure 6:
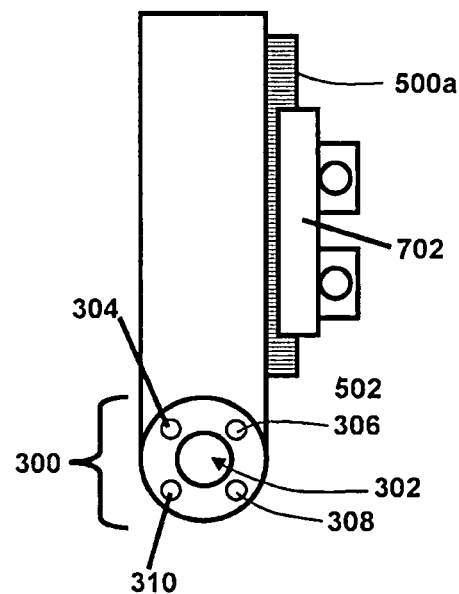
FIG. 6 shows a view of the embodiment of FIG. 5 from a second angle.

FIG. 6 shows a further elevation of the embodiment of FIG. 5 looking onto the supply docking-manifold 300; ie looking at FIG. 5 from the right hand side.

A first movement mechanism is provided to move the supply-unit 214 in a vertical manner and the embodiment being described this comprises a rack 500 provided along a portion of the outer surface of the supply-unit 214. The skilled person will appreciate that although the Figure illustrates the rack on a side of the supply-unit 214 is could be provided at any location around the circumference of the supply-unit 214 and there may in fact be more than one such rack. Indeed, as can be seen from FIG. 7 the embodiment being described comprises two racks 500a, 500b on the side of the supply-unit 214.

Figure 7:
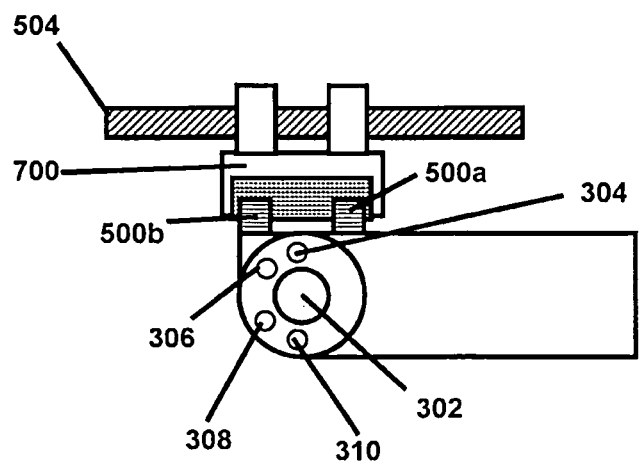
FIG. 7 shows a view of the embodiment of FIG. 5 from a third angle highlighting a transport mechanism.

FIG. 7 also more clearly shows the pinion mechanism 700 mounted on a frame 502. As the pinion mechanism 700 is activated then gears therein interact with the rack 500a, 500b and move the supply-unit 214 in up or down depending on the direction in which the gears are driven.

It will also be noted from FIG. 7, that in the embodiment being described the housings of the pinion mechanism. 700 engage with the racks 500a, 500b in order to act as a guide for the supply-unit 214. In other embodiments, other guide mechanisms may be provided.

A second movement mechanism is provided to move the supply-unit 214 in a horizontal direction. In the embodiment being described, the second movement mechanism comprises two worm gears 504,506 provided, one toward the top and one toward the bottom of the frame 502.

It will be appreciated that each of the first and second movement mechanisms provide at least one mechanism arranged to move the supply docking-manifold 300 into and/or out of connection with the processing-head docking-manifold such that when the two manifolds are connected the or each media is supplied to the processing head; ie the ducts 302 to 310 within each of the manifolds are connected to one another.

A driven gear is provided within a housing 702 adjacent the pinion mechanism 700 and arranged to drive the supply-unit 214 relative to the worm gear 504, 506 thereby moving the supply-unit 214 in a horizontal direction.

In other embodiments, the first and second movement mechanisms may be provided by mechanisms other than gears. For example, pneumatic and/or hydraulic actuators may be utilised. Whilst in the embodiment being described there are two movement mechanisms, the skilled person will appreciate that in other embodiments there may be fewer, or more, movement mechanisms.

Figure 8:
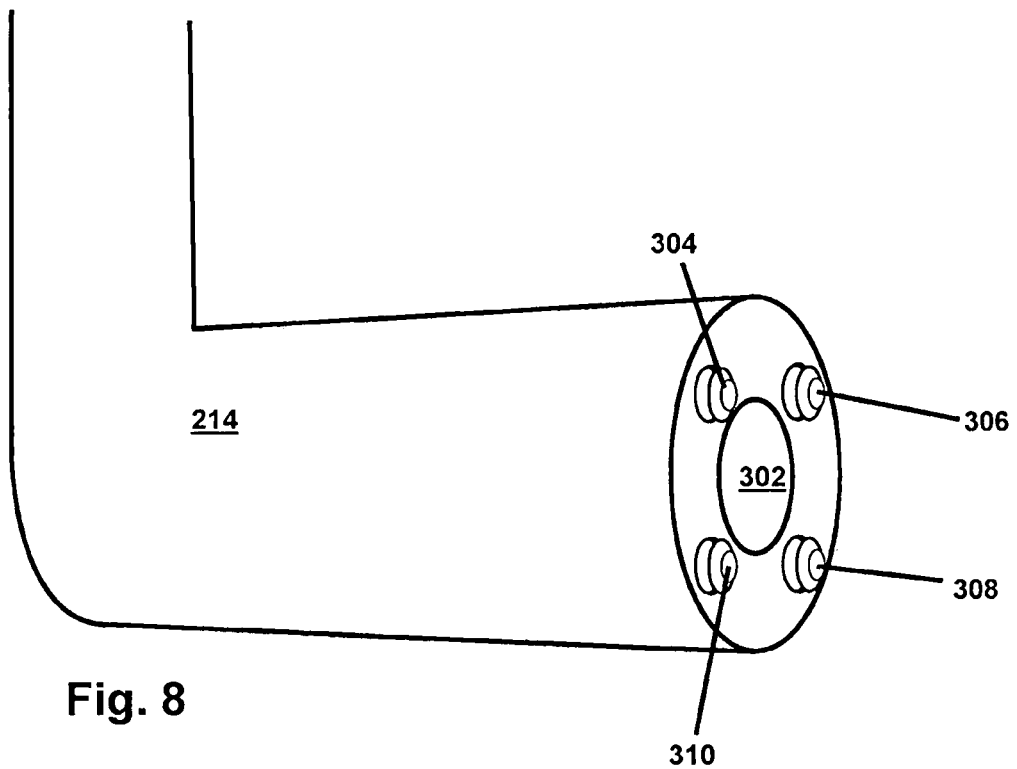
FIG. 8 shows a perspective view of the embodiment of FIG. 5 illustrating media supplies thereof.

FIG. 8 shows the supply docking-manifold 300 of the embodiment of FIG. 5 in more detail. It can be seen that in this embodiment the ducts 304-310 comprise connectors at end regions thereof and arranged to connect with complementary connectors within the processing-head docking manifold.

Figure 9:
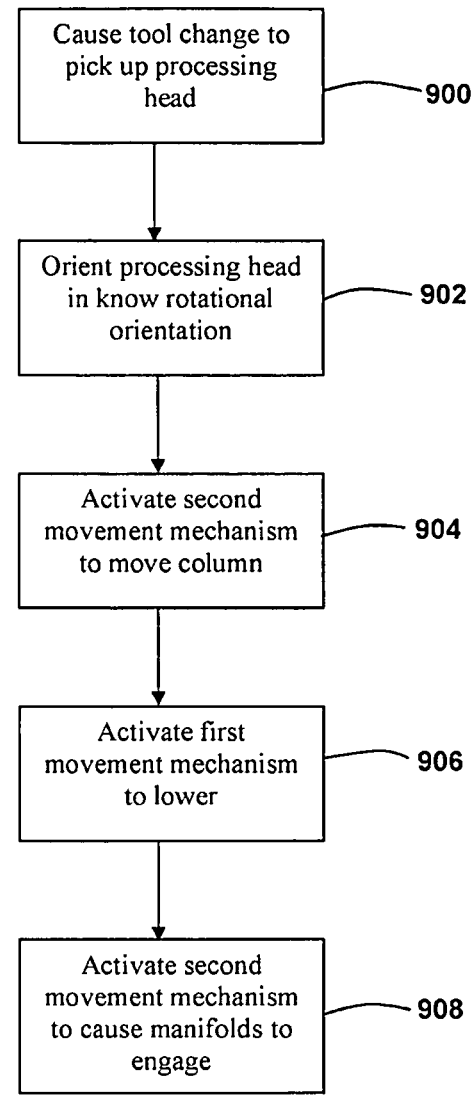
FIG. 9 outlines a flow-chart illustrating a method of using the embodiment described in relation to FIGS. 1 to 5.

In summary of the above, and with reference to FIG. 9, in order to change the processing head on the machine-tool 100 the machine-tools controller 106 instigates its tool changing routine and picks up the processing head 200 (after docking any existing head that it was previously carrying)—step 900.

Once the processing head 200 has been engaged within the clamping mechanism 202 of the machine tool 100 if needed, the processing head 200 is rotated by the machine tool 100 until the processing head 200 is presented in a known orientation in order that the two manifolds can be connected—step 902.

Once the processing head 200 is oriented in readiness to receive the supply-unit 214 the second movement mechanism is operated in order to move the supply docking-manifold 300 away from the docking surface 400—step 904.

Thereafter, the first movement mechanism is operated in order to lower the supply-unit 214—step 906.

Once the supply-unit is in the correct vertical height, the second movement mechanism is operated again to bring the supply docking-manifold on the supply-unit 214 into engagement with the processing-head docking-manifold—step 908.

As the two manifolds engage the planar surfaces thereof and the locating mechanisms 314, 316 ensure that the supply-unit 214 is correctly oriented with respect to the processing head. The skilled person will appreciate that the correct alignment of the supply-unit 214 relative to the processing head 200 helps to ensure alignment of the components which transmit the energy source (eg the laser beam). In this case the reflectors 208, 222 relative to one another helps to ensure that the laser beam is correctly focused.

Embodiments of the invention may find a number of applications and in particular embodiments will typically allow an energy source and associated media to be connected to a machine-tool 100 to allow the machine-tool 100 to process a work-piece 106 with the energy-source.

One particular application is that of laser-deposition (also known as laser cladding). Laser deposition may find utility in repairing parts, including turbine blades, pump-impellers, or the like, which have become damaged. The laser deposition processes allow material to be added to the part which can subsequently be machined to finalise the repair of the part.

Figure 10:
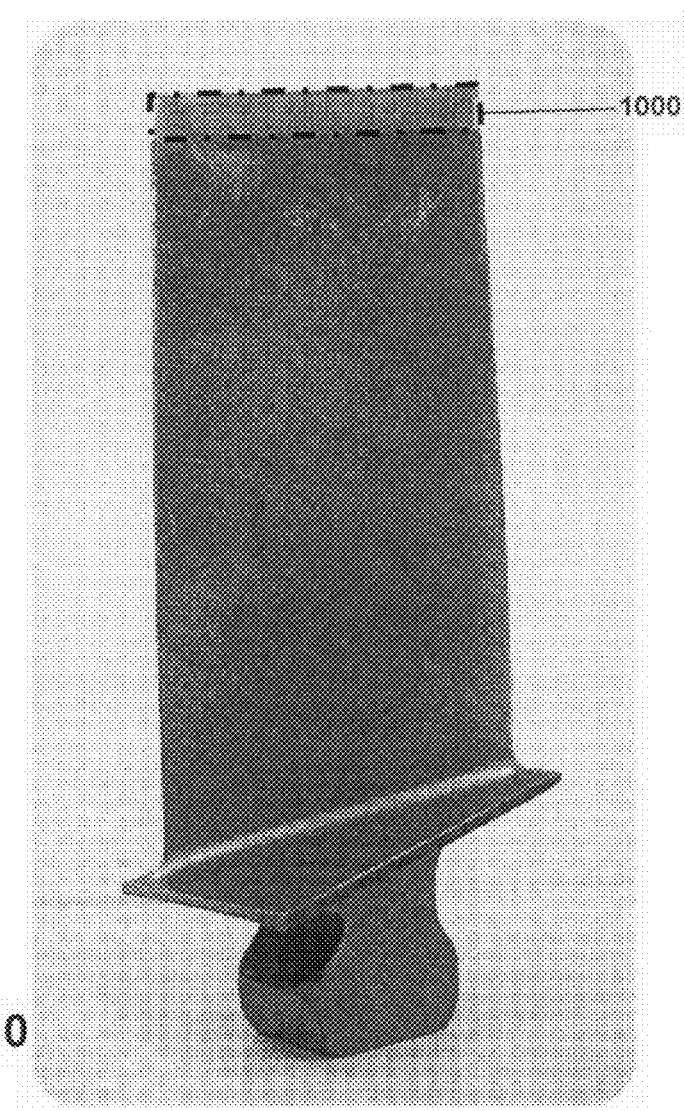
FIG. 10 shows an example work-piece that has been processed by a machine-tool according to an embodiment of the invention.

FIG. 10 shows a turbine-blade that has been repaired in which fresh material has been added to a tip region 1000 highlighted by the dotted line by this approach.

In other embodiments, the processing head may be utilised to provide other processes which include any of the following: welding; deposition (including additive manufacturing, 3D printing, and directed energy deposition); thermal spraying (in some cases utilising a divergent beam of energy); cladding; cutting; in process thermal management; heat treatment; energy (ie laser) machining; or the like.

Figure 11:
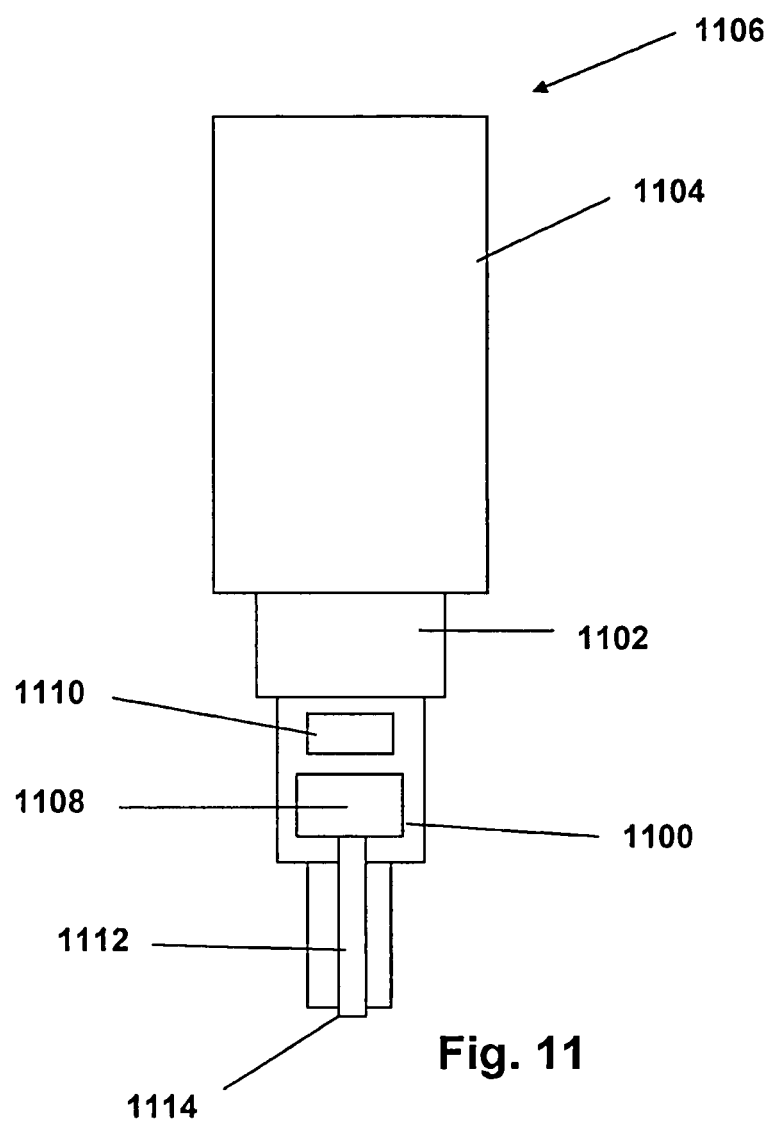
FIG. 11 shows a schematic illustration of an alternative processing head in accordance with another aspect of the invention.

FIG. 11 is a schematic illustration of an embodiment of a further aspect of the invention in which a media reservoir is provided in the processing head. As described before the processing head 1100 is provided in a clamping mechanism 1102 attached to a spindle 1104 which is part of the machine tool 1106. The processing head comprises a media reservoir 1108 located in the processing head together with an energy source 1110.

Energy from the energy source is applied to the media in the media reservoir 1108. The media is then transferred along a passage 1112 to an application point 1114 where the media is applied to the workpiece. Movement of the processing head and location of the application point 1114 is controlled primarily by the machine tool or by the controller as before. Additional motion such as rotation or fine positioning is typically incorporated into the processing head. The energy source 1110 comprises a heat source and is connected to an electrical supply in the machine tool through the spindle 1104 or via one or more docking systems as in the embodiment of the invention as illustrated in FIG. 2. The media reservoir comprises a chamber arranged to contain a supply of media such as a filament of polymer. The chamber can be refilled with additional media material while the processing head is in use via a docking system as in the embodiment of FIG. 2 or alternatively when located in a tool changer.

Figure 12:
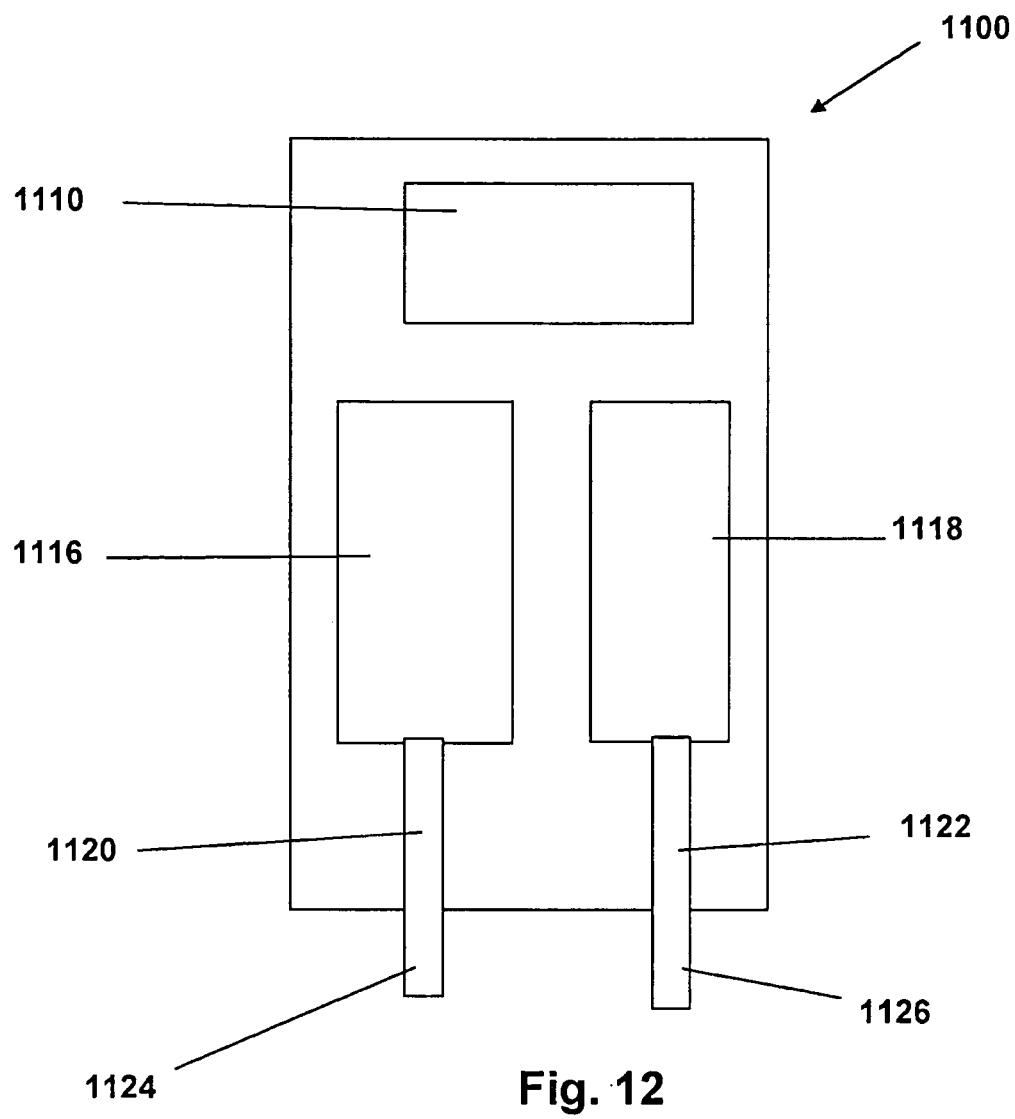
FIG. 12 is an illustration of a further alternative processing head.

FIG. 12 is an illustrative embodiment of an alternative processing head comprising two media supplies. For ease only the processing head 1100 is shown in FIG. 12. In this embodiment the processing head comprises an energy source 1110 together with a first media supply 1116 and a second media supply 1118, each connected to respective passages 1120 and 1122 leading to respective first and second application points 1124 and 1126. The first media supply can comprise a building material and the second media supply can comprise a support material or the first and second media may comprise different colours or alternative media that are used to construct a more complex work piece. The first media can be one of a build material or a support media. The controller or the machine tool can control application of the media by positioning of the processing head and control of deposition of the media. Additionally, fine positioning can be incorporated into the processing head such as extension or retraction of the application points to favour one or the other. The media reservoirs 1116 and 1118 can be replenished when the processing head is in use via a media supply while in an operative position or while the processing head is off cycle in the tool changer. The energy source can be a battery powered energy source and can also be recharged while the processing head is in the tool changer.

Figure 13:
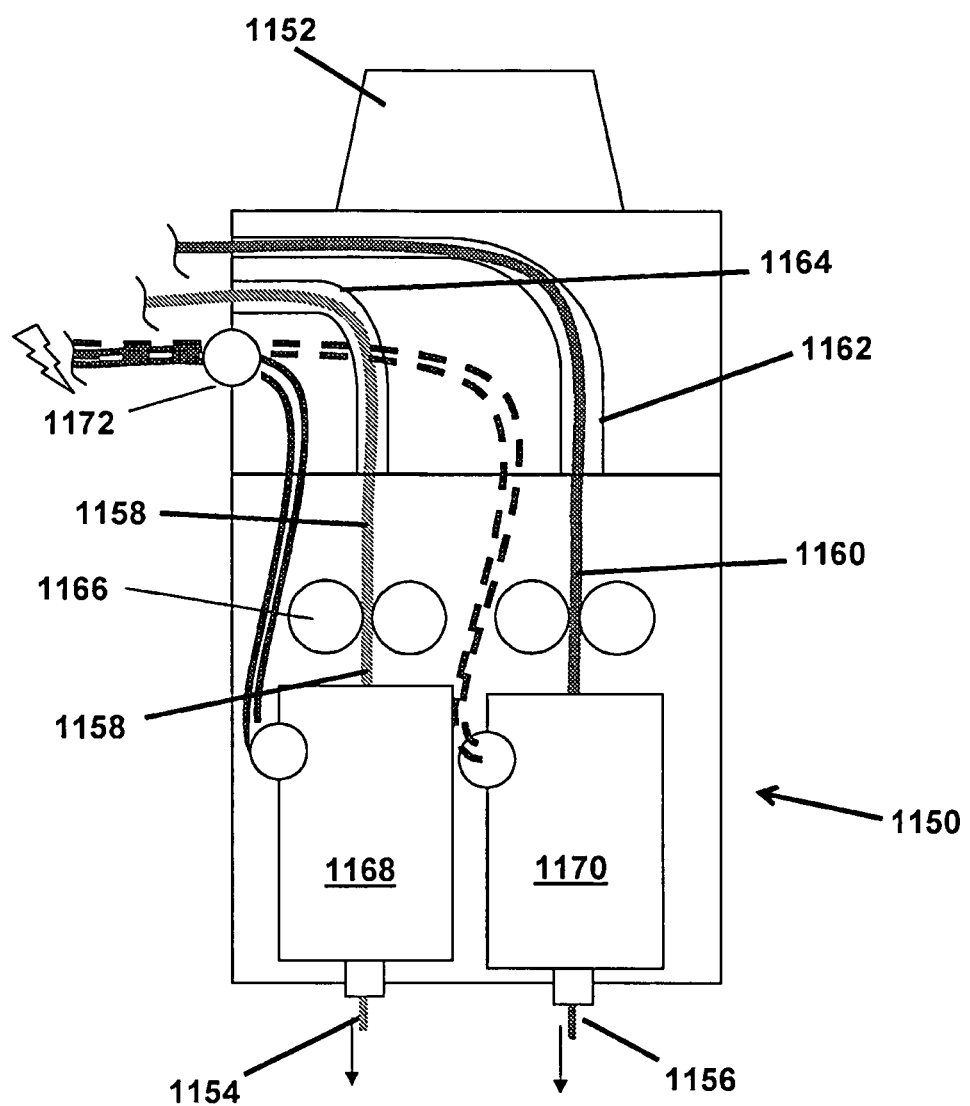
FIG. 13 is a schematic drawing of an embodiment for applying a heated polymer.

Turning now to FIG. 13, which shows a material processing head arranged to extrude heated polymer with power and media supplied external to the processing head, perhaps through a manifold as described above. In this embodiment the processing head 1150 comprises a clamping mechanism 1152 and a first deposition head 1154 and a second deposition head 1156. The clamping mechanism, which is sometimes referred to as a tool holder, may be an ISO 40 taper or HSK 63a.

The processing head is one example representing "material extrusion" devices as defined by the ASTM F2792 standard. Thus, the deposition heads 1154 and 1156 are arranged to extrude material to a work piece. The processing head also comprises a first and a second media supply 1158 and 1160. In this embodiment the media supply comprises a first channel and a second channel 1162 and 1164 each arranged to guide a first and a second filament of polymer forming the media providing the media supplies 1158, 1160. A media is supplied to the first and second channels from a media supply mechanism. The media supply mechanism is arranged to connect to a manifold. A power supply is also provided to the processing head from the manifold, similar mutatis mutandis to the manifold described in earlier figures. A filament feeding mechanism 1166 is located in the processing head and feeds the first and second filament to respective first 1168 and second 1170 heated chambers. The power supply (typically connected via a manifold and the connection is shown here at 1172) supplies energy to first and second heating chambers and within the respective chambers the first and second filaments are heated and a semi liquid media is supplied to the first 1154 and second deposition head 1156.

Figure 14:
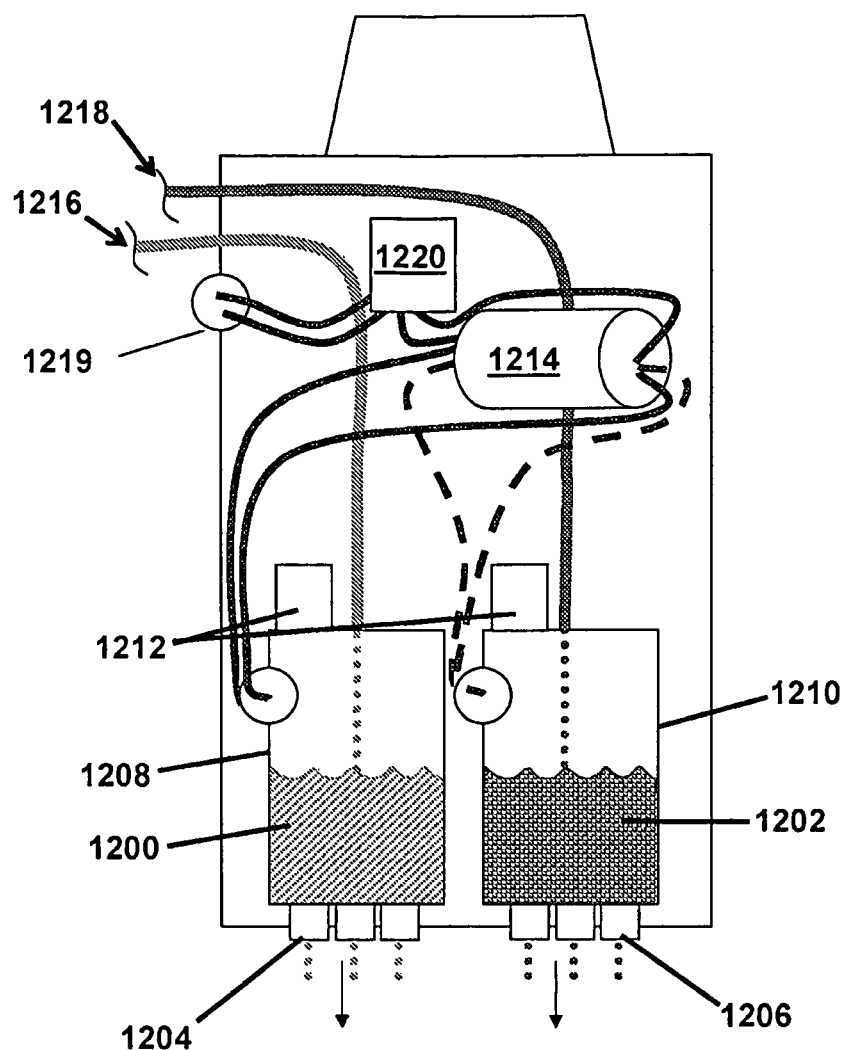
FIG. 14 is a schematic drawing of an embodiment for applying a liquid media to a work piece.

An alternative embodiment is shown in FIG. 14 where the head is designed for material jetting as acknowledged by the ASTM F2792 standard. Thus, the head of FIG. 14 may be similar to an inkjet, an aerosol jet, or the like. In this embodiment a first 1200 and a second 1202 liquid media is provided in the processing head. In this embodiment each deposition head 1204 and 1206 each comprise a number of liquid jets arranged to deposit liquid droplets on, or at least toward, the work piece. The media may be liquid or may be selected from other jettable fluids such as liquids filled with suspended particles as is known in the art. A first 1208 and a second 1210 media chamber are each provided in the processing head and a supply of media is in each chamber. The media may optionally be temperature controlled, especially where maintaining a jettable viscosity is critical. A controller is provided to control deposition of the media from the processing head onto the work piece. The controller in this embodiment includes a pressure management valve 1212. An energy source is provided and comprises a battery 1214, or a similar mechanism to generating power. The battery 1214 provides energy for controlling application of the media to the work piece and can also provide energy in the form of heat to the media. Each first and second chamber is also connected to a first and a second duct 1216, 1218 which allow the media within the media chambers 1208, 1210 to be replenished. The first and second ducts are connectable to a material feed or manifold in the tool changer. Other embodiments may not be replenishable in this manner.

The manifold can be connected to the processing head while the head is clamped to the machine tool. The battery can also be connected to a mains electricity supply through the manifold (ie through a connection 1219) and the battery can be recharged while the manifold is connected to the processing head.

Also indicated in FIG. 14 is a control board 1220 provided to control movement of the processing head, jetting pulses and to control pressure in the media chambers 1208 and 1210.

A wireless communication mechanism for connecting to a data source for data for printing an image and for controlling and coordinating the position of the head by mechanism of the CNC position controller is also provided. Such wireless communication mechanisms are conventional and are not described further. Alternatively, data may be supplied to the device via a wired connection presented to the head from the manifold or docking system, by including a stored memory device into the processing head such as a memory card or by more conventional mechanisms.

Figure 15:
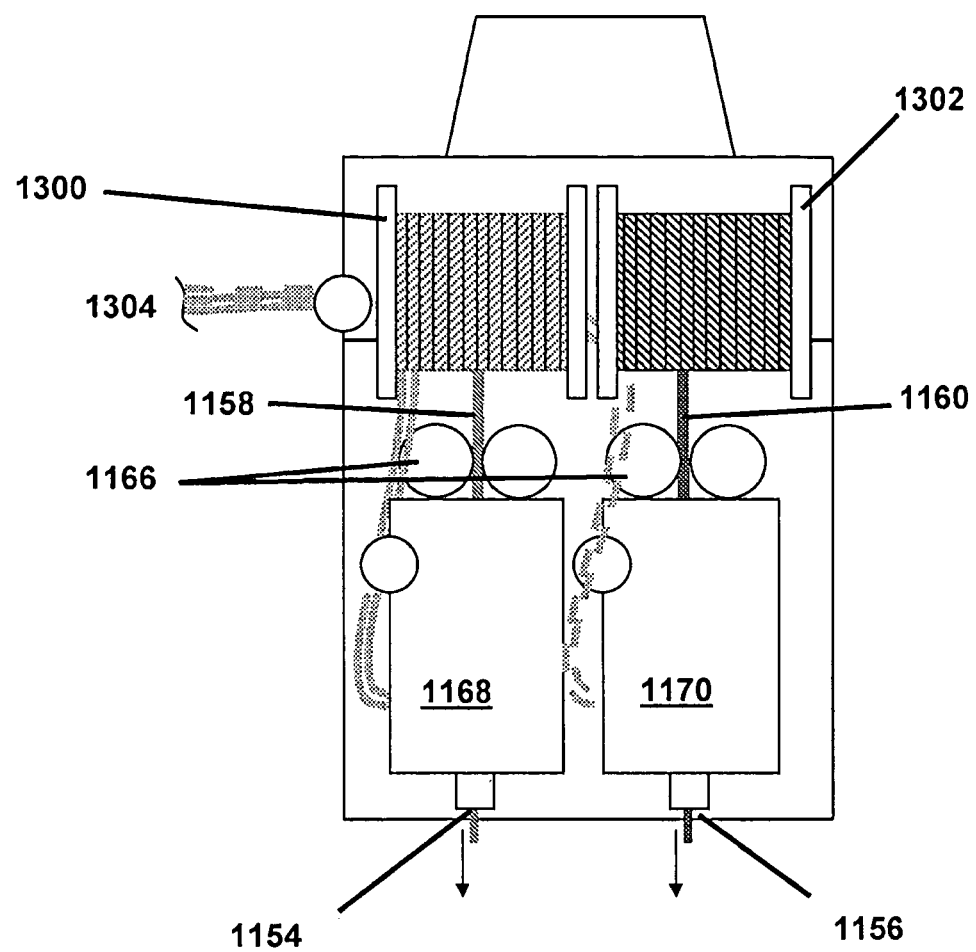
FIG. 15 is a schematic drawing of an embodiment for applying a heated polymer.

Another embodiment of the invention is illustrated in FIG. 15 which shows an embodiment arranged to extrude heated polymer. In this embodiment as in the embodiment of FIG. 13 the media is provided in the form of a polymer filament. The same reference numerals are used for corresponding elements. In this embodiment first and second filaments 1158 and 1160 are each provided as a filament wound on first and second spools 1300 and 1302. First and second filaments are moved from the respective first and second spools 1300 and 1302 by respective filament feeding mechanisms 1166. An energy source (not shown) provides energy to the first and second chambers to heat the filaments as they pass through the first and second chambers 1168 and 1170. A power supply 1304 is connected to the processing head through a manifold connectable to the processing head. In this embodiment the entire processing head can be automatically changed when the media is used up. In this way processing is not delayed and the head with the depleted spools can be replenished while the processing head is out of use and located in the tool changer or other storage location.

Figure 16:
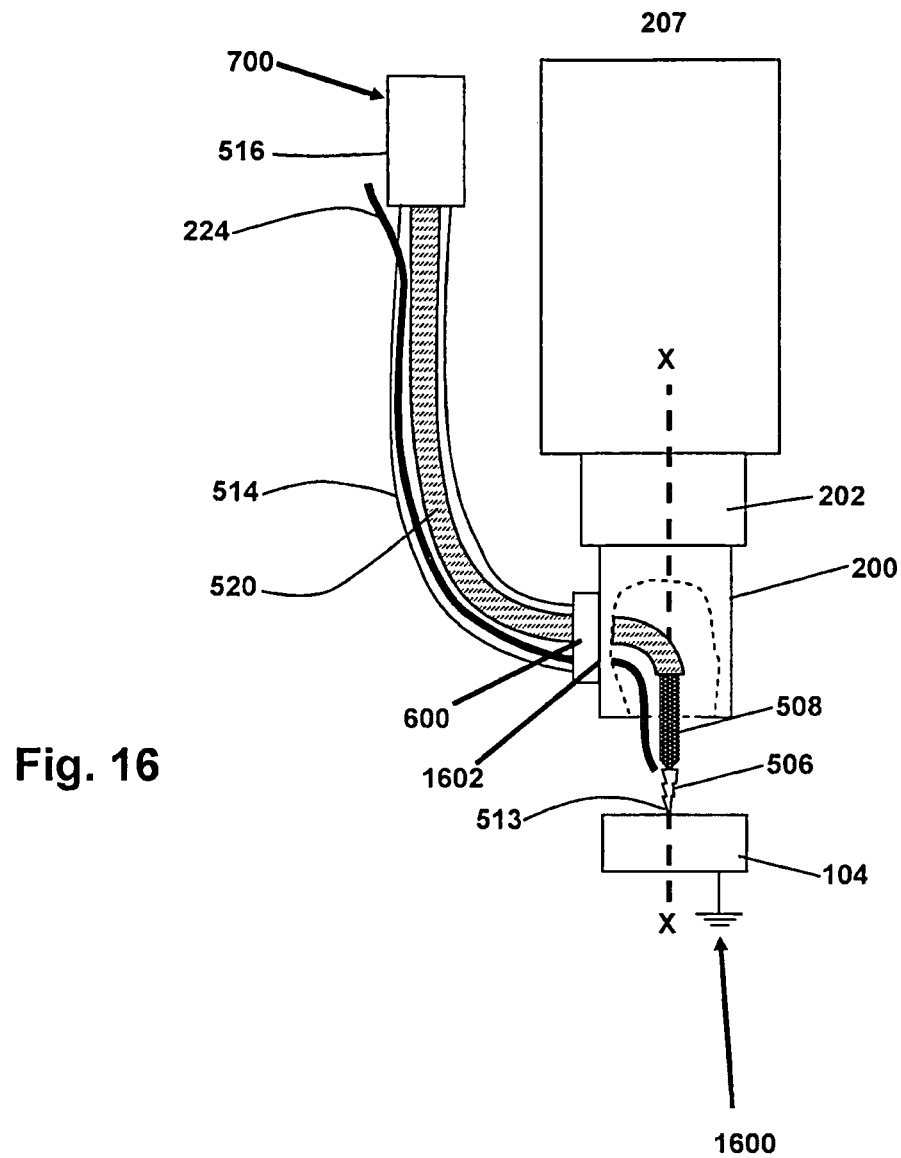
FIG. 16 shows a further embodiment using a plasma transferred arc based energy source.

FIG. 16 shows a further embodiment having a processing head 200 arranged to selectively be held in a clamping mechanism 202. This embodiment is perhaps similar to the embodiment shown in FIGS. 2 though 4 and like parts are referred to with like reference numerals.

In the embodiment being described in relation to FIG. 16 the energy source is provided by a high-voltage electrical supply 516 and the guiding mechanism arranged to direct the energy source to the work-piece 104 is provided by a conductive path 520 and electrode 508. Typically, the conductive path 520 may be provided by a wire, such as a copper wire, cable, or the like.

A media supply 224 is also provided and arranged to supply a fluid, which may be any one or more of the other fluids described herein, to the work-piece 104.

For convenience and protection, the conductive path 520 and media supply 224 are contained within a flexible supply unit 514.

In the embodiment of FIG. 16, it will be seen that work-piece is connected to earth 1600 and thereby it is possible to strike an arc 513 with the work-piece to provide a plasma based energy source.

As with the earlier embodiment, a supply docking manifold 600 is provided and here is provided on an end region of the flexible supply unit 514 and arranged to be connected to a processing-head manifold 1602 on the processing head 200.

A substantially planar docking surface 700 may be provided against which the supply docking manifold 600 may be stored when not in use. Here the planar surface is shown on the electrical supply 516.

Figures 17A, 17B:
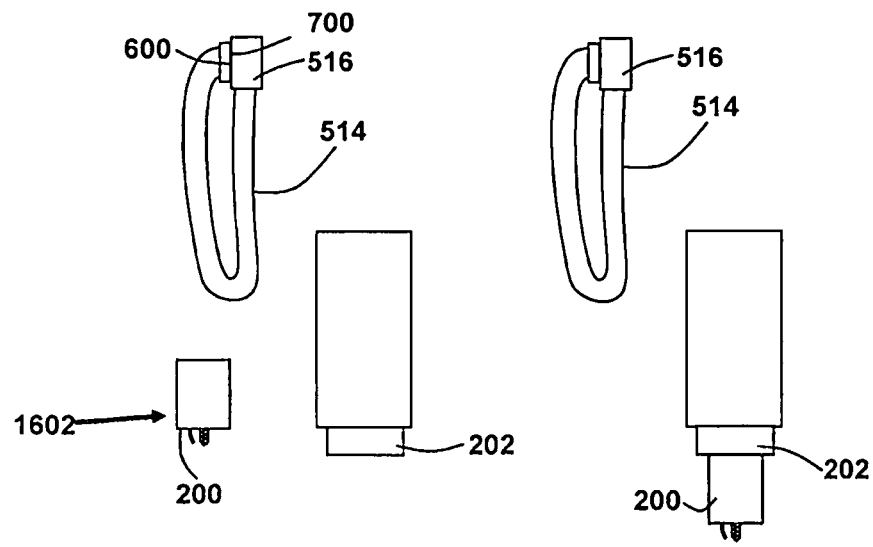
FIG. 17a shows the embodiment of FIG. 16 in an unassembled manner.
FIG. 17b shows the embodiment of FIG. 17a in a partially assembled manner.

FIGS. 17a to 17b show the embodiment of FIG. 16 in various stages of assembly.

Thus, it can be seen from FIG. 17a that the processing head 200 is kept in a tool station, or the like, remote from the clamping mechanism 202 when it is not being used. In this state, the clamping mechanism is free to hold other processing heads or machining heads to perform processes on the work-piece 104 that the processing head 200 cannot perform. It can be seen that the supply docking manifold 600 is placed on the substantially planar docking surface 700.

A mechanism, such as a robot arm, tool changing mechanism or the like (not shown) is then used to move the processing head 200 into the clamping mechanism 202. This arrangement of the components is shown in FIG. 17b and as such, the robot arm may be thought of as being a mechanism arranged to move the supply docking-manifold; ie a movement mechanism.

Figure 17C:
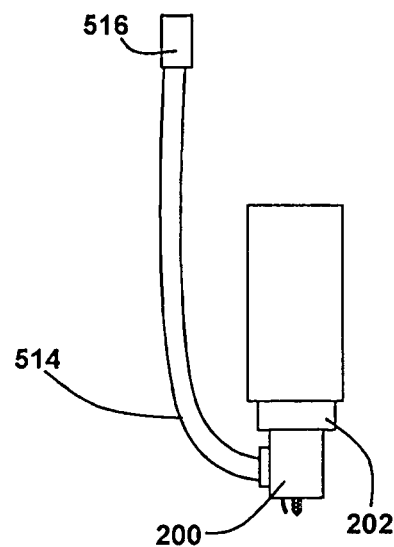
FIG. 17c shows the embodiment of FIGS. 17a and 17b in a fully assembled manner.
Figure 10:
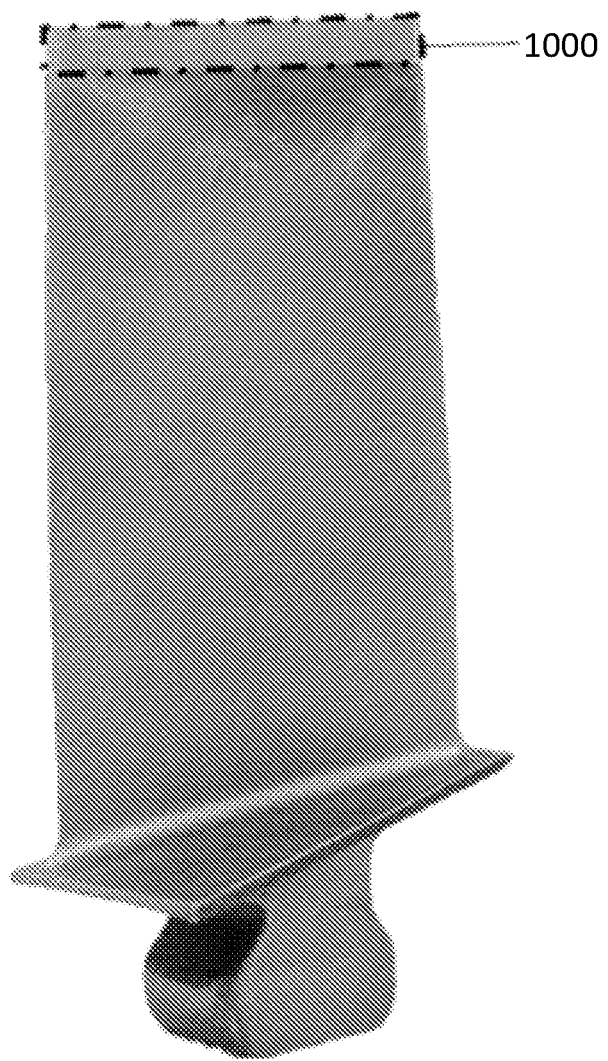

Further a movement mechanism (which may or may not be the same movement mechanism used to move the processing head), such as a robotic arm or the like (not shown), is then used to move the flexible supply unit 514, including the guiding mechanism 520, and the supply docking manifold 600 into place such that the supply docking manifold 600 is connected to the processing-head docking manifold 1602. This arrangement of components is shown in FIG. 17c and allows fluids to be passed down the media supply 224 through the supply docking manifold 600, through the processing-head docking manifold 1602 and into the processing head 200. Further, the connection of the guiding mechanism 520 allows electricity to be passed from the electrical supply 516, to the processing head 200, through the electrode 508, across a gap to the work-piece 104 and finally on to ground 1600.

FIG. 18 shows a further example embodiment in which a processing head is arranged to provide a source of energy which is directed on to a work piece adjacent the processing head.

The Figure is similar to FIG. 2 and like parts are referred to with like reference numerals. However, in the embodiment being described in relation to FIG. 18 the processing head does not supply media and is simply arranged to supply energy to the work piece. The docking mechanism may function in a similar manner to that described in relation to FIGS. 3, 4a, 4b and 4c or in FIGS. 16a, 16b, 16c and 17, mutatis mutandis and will not be described again. The skilled person will note that the 304, 306, 308 and 310 may well be omitted in an embodiment that supplies energy, without media to the work piece. However, it is conceivable that such embodiments will supply fluids such as coolants, shielding gases and the like. Such fluids might be passed through ducts in the manifold as shown in FIG. 3. In yet further alternative embodiments, fluids may be delivered directly onto the work piece and not via the manifold and subsequently processed via the processing head.

It will be noted that, in FIG. 18, the media supply has been removed.

Thus, in the embodiment of FIG. 18, the controller 106 is arranged to control the movement of the laser beam 206 to move across the work piece 104. The speed at which the controller moves the laser beam 206 across the work piece will affect the power delivered to a given area (ie portion) of the work piece. In addition, the controller 106 is arranged to turn the laser on and/off to control the power.

It will be appreciated that the skilled man may vary the combination of features that are provided in a particular embodiment of a processing head. For example fewer or more deposition points could be included in the same head. Additionally treatment energy sources could be incorporated into the heads such as UV, IR, photonic light sources or the like in order to cure or fuse the media being deposited as is known in the art.

The invention claimed is:

1. A machine tool comprising:
   a clamp configured to temporarily receive each of a plurality of different processing heads; and
   a docking manifold configured to be alternatively moved between an active position and an inactive position,
   wherein the docking manifold, when in the active position, is to temporarily connect to a complimentary docking manifold of a particular processing head when the particular processing head is received by the clamp, wherein the docking manifold comprises a first set of ducts configured to align with a complimentary second set of ducts of the complimentary docking manifold when the docking manifold is temporarily connected to the complimentary docking manifold, and the first set of ducts comprises at least one duct through which the one or more media are to be supplied to the particular processing head, wherein the one or more media comprise a processable medium to be processed by the particular processing head, wherein the docking manifold is to be moved to the inactive position when the clamp receives another one of the plurality of different processing heads.

2. The machine tool of claim 1, wherein:

the clamp is configured to temporarily receive different processing heads in a plurality of different processing heads at different times; and the docking manifold is configured to be temporarily connected to each of at least some of the processing heads in the plurality of different processing heads.

3. The machine tool of claim 1, wherein the docking manifold is further configured to allow energy from an energy source of the particular processing head to be transmitted into the processing head.

4. The machine tool of claim 1, wherein at least some of the first set of ducts are configured to be sealed when the docking manifold is not connected to the complimentary docking manifold.

5. The machine tool of claim 1, wherein the first set of ducts of the docking manifold are further configured to receive a cooling medium to cool at least a portion of the processing head.

6. The machine tool of claim 1, wherein the docking manifold is configured to align an energy source with a particular one of the first set of ducts of the docking manifold.

7. The machine tool of claim 1, wherein the docking manifold is configured to provide to the particular processing head at least one of: a laser beam, an electron beam, an arc, plasma, focused electromagnetic radiation, or divergent electromagnetic radiation.

8. The machine tool of claim 1, wherein the docking manifold is configured to provide to the particular processing head at least one of: a metal, a polymer, a ceramic material, a cooling fluid, a processing fluid, or a gas.

* * * * *